United States Patent
Kim et al.

(10) Patent No.: US 9,544,887 B2
(45) Date of Patent: Jan. 10, 2017

(54) METHOD FOR RECEIVING DOWNLINK SIGNAL, AND USER DEVICE, AND METHOD FOR TRANSMITTING DOWNLINK SIGNAL, AND BASE STATION

(75) Inventors: Hakseong Kim, Anyang-si (KR);
Hanbyul Seo, Anyang-si (KR);
Daewon Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 263 days.

(21) Appl. No.: 14/114,485

(22) PCT Filed: May 3, 2012

(86) PCT No.: PCT/KR2012/003462
§ 371 (c)(1),
(2), (4) Date: Oct. 28, 2013

(87) PCT Pub. No.: WO2012/150823
PCT Pub. Date: Nov. 8, 2012

(65) Prior Publication Data
US 2014/0050192 A1    Feb. 20, 2014

Related U.S. Application Data

(60) Provisional application No. 61/483,044, filed on May 5, 2011, provisional application No. 61/484,224, filed on May 10, 2011.

(51) Int. Cl.
*H04W 72/04* (2009.01)
*H04L 5/00* (2006.01)
*H04L 5/14* (2006.01)

(52) U.S. Cl.
CPC ............ *H04W 72/042* (2013.01); *H04L 5/001* (2013.01); *H04L 5/0048* (2013.01); *H04L 5/0053* (2013.01); *H04L 5/0023* (2013.01); *H04L 5/1469* (2013.01)

(58) Field of Classification Search
None
See application file for complete search history.

(56) References Cited

U.S. PATENT DOCUMENTS

2010/0303011 A1* 12/2010 Pan .......... H04L 5/001
370/328
2011/0170496 A1* 7/2011 Fong ...... H04L 5/0053
370/329

(Continued)

FOREIGN PATENT DOCUMENTS

KR    10-2008-0056621    6/2008
KR    10-2008-0076662    8/2008

(Continued)

OTHER PUBLICATIONS

PCT International Application No. PCT/KR2012/003462, Written Opinion of the International Searching Authority dated Nov. 29, 2012, 16 pages.

*Primary Examiner* — Jeffrey M Rutkowski
*Assistant Examiner* — Ning Li
(74) *Attorney, Agent, or Firm* — Lee Hong Degerman Kang Waimey

(57) ABSTRACT

The present invention provides a method and a device for transmitting/receiving a control channel in a downlink subframe, which divides into a control area and a data area. In the present invention, a first downlink control channel is transmitted in the control area of the downlink subframe, and/or a second downlink control channel is transmitted in the data area of the downlink subframe. The first downlink control channel carries downlink control information having a predetermined format, and the second downlink control (Continued)

channel carries downlink control information having a format corresponding to a transmission mode of a user device.

10 Claims, 17 Drawing Sheets

(56) References Cited

U.S. PATENT DOCUMENTS

| | | | |
|---|---|---|---|
| 2011/0194501 A1* | 8/2011 | Chung et al. | 370/328 |
| 2011/0222485 A1* | 9/2011 | Nangia et al. | 370/329 |
| 2011/0249633 A1* | 10/2011 | Hong | H04L 5/0053 |
| | | | 370/329 |
| 2011/0271168 A1* | 11/2011 | Han et al. | 714/807 |
| 2011/0274066 A1* | 11/2011 | Tee | H04L 5/001 |
| | | | 370/329 |
| 2011/0299489 A1* | 12/2011 | Kim et al. | 370/329 |
| 2012/0021756 A1* | 1/2012 | Kwon et al. | 455/450 |
| 2012/0039179 A1* | 2/2012 | Seo | H04L 5/001 |
| | | | 370/241 |
| 2012/0113945 A1* | 5/2012 | Moon | H04L 1/1861 |
| | | | 370/329 |
| 2012/0195267 A1* | 8/2012 | Dai et al. | 370/329 |
| 2013/0010619 A1* | 1/2013 | Fong | H04W 74/002 |
| | | | 370/252 |

FOREIGN PATENT DOCUMENTS

| | | | | |
|---|---|---|---|---|
| KR | 10-2009-0097215 | | 9/2009 | |
| KR | 10-2009-0121368 | | 11/2009 | |
| KR | 10-2010-0124677 | | 11/2010 | |
| KR | WO2010131926 | * | 11/2010 | H04B 7/26 |

* cited by examiner (a)

(b)

METHOD FOR RECEIVING DOWNLINK SIGNAL, AND USER DEVICE, AND METHOD FOR TRANSMITTING DOWNLINK SIGNAL, AND BASE STATION

CROSS-REFERENCE TO RELATED APPLICATIONS

This application is the National Stage filing under 35 U.S.C. 371 of International Application No. PCT/KR2012/003462, filed on May 3, 2012, which claims the benefit of U.S. Provisional Application Ser. No. 61/483,044, filed on May 5, 2011, and 61/484,224, filed on May 10, 2011, the contents of which are all hereby incorporated by reference herein in their entirety.

TECHNICAL FIELD

The present invention relates to a wireless communication system, and more particularly, to a method and device for receiving downlink control information, and a method and device for transmitting downlink control information.

BACKGROUND ART

In accordance with the advent and spread of various devices such as a smart phone and a tablet PC, which require machine to machine (M2M) communication and high data transmission rate, the amount of data requested to be processed in a cellular network has been rapidly increased. In order to satisfy such increased data request, the communication technology has been developed towards the carrier aggregation technology and the cognitive radio technology, which are intended to use more frequency bands efficiently, and the multi-antenna technology and the multi-base station cooperative technology, which are intended to increase data capacity within a limited frequency. Meanwhile, a communication environment has evolved towards a direction that density of nodes that may be accessed by a user is increased. A communication system provided with nodes of high density may provide a user with a communication service of higher system throughput through cooperation between the nodes.

DISCLOSURE

Technical Problem

In accordance with the introduction of a new wireless communication technology, the number of user equipments to which a base station should provide a service has been increased, and the amount of downlink control information that should be provided to each user equipment has been also increased. Since the amount of radio resources available for communication between the base station and the user equipment(s) is limited, a new method for allowing a base station to efficiently provide downlink control information to user equipment(s) by using limited radio resources will be required.

Accordingly, an object of the present invention devised to solve the conventional problem is to provide a method and device for efficiently transmitting and receiving downlink control information.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for receiving, by a user equipment, a downlink signal from a base station comprises: detecting at least one of a first downlink control channel and a second downlink control channel; and receiving a downlink data channel corresponding to the detected downlink control channel, wherein detecting the least one of the first downlink control channel and the second downlink control channel includes decoding the first downlink control channel according to a predetermined downlink control information format in a control region of a subframe and decoding the second downlink control channel according to a downlink control information format corresponding to a transmission mode of the user equipment in a data region of the subframe.

In another aspect of the present invention, a user equipment for receiving a downlink signal from a base station comprises: a radio frequency (RF) unit configured to transmitting or receiving a signal; and a processor configured to control the RF unit. The processor detects at least one of a first downlink control channel and a second downlink control channel and controls the RF unit to receive a downlink data channel corresponding to the detected downlink control channel. The processor is configured to decode the first downlink control channel according to a predetermined downlink control information format in a control region of a subframe and decode the second downlink control channel according to a downlink control information format corresponding to a transmission mode of the user equipment in a data region of the subframe so as to detect the at least one of the first downlink control channel and the second downlink control channel.

In still another aspect of the present invention, a method for transmitting, by a base station, a downlink signal to a user equipment comprises: transmitting at least one of a first downlink control channel and a second downlink control channel; and transmitting a downlink data channel corresponding to the transmitted downlink control channel, wherein the first downlink control channel carries downlink control information with a predetermined downlink control information format in a control region of a subframe, and the second downlink control channel carries downlink control information with a downlink control information format corresponding to a transmission mode of the user equipment in a data region of the subframe.

In further still another aspect of the present invention, a base station for transmitting a downlink signal to a user equipment station comprises: a radio frequency (RF) unit configured to transmitting or receiving a signal; and a processor configured to control the RF unit. The processor controls the RF unit to transmit at least one of a first downlink control channel and a second downlink control channel and controls the RF unit to transmit a downlink data channel corresponding to the transmitted downlink control channel. The first downlink control channel carries downlink control information with a predetermined downlink control information format in a control region of a subframe, and the second downlink control channel carries downlink control information with a downlink control information format corresponding to a transmission mode of the user equipment in a data region of the subframe.

In the above aspects of the present invention, information indicating a search space of the second downlink control channel may be provided from the base station to the user equipment.

In the above aspects of the present invention, the predetermined downlink control information format may be a downlink control information format 1A for a single antenna port.

The solutions are only a part of the embodiments of the present invention, and various embodiments based on technical features of the present invention may be devised and understood by the person with ordinary skill in the art based on the detailed description of the present invention.

Advantageous Effects

According to the present invention, downlink control information may efficiently be transmitted and received. As a result, overall throughput of the wireless communication system is increased.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

BEST MODE FOR CARRYING OUT THE INVENTION

Figure 1:
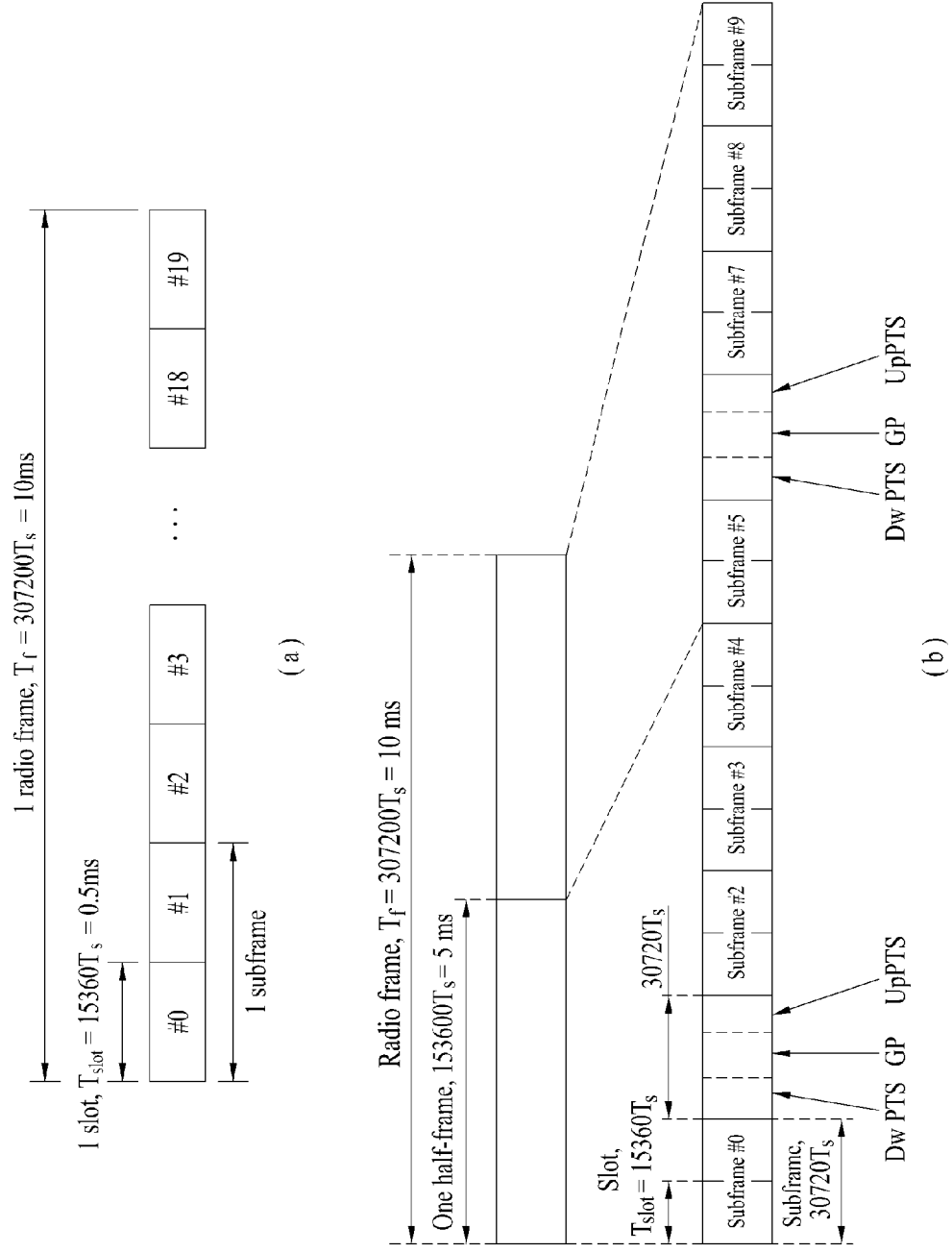
FIG. 1 is a diagram illustrating an example of a radio frame structure used in a wireless communication system.

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Also, techniques, devices, and systems described herein may be applied to various wireless multiple access systems. For convenience of description, it is assumed that the present invention is applied to 3GPP LTE(-A). However, technical features of the present invention are not limited to the 3GPP LTE(-A). For example, although the following description will be made based on the assumption that the mobile communication system is the 3GPP LTE or LTE-A system, the following description may be applied to other mobile communication systems except for particular matters of the 3GPP LTE or LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts In the present invention, a user equipment (UE) may be fixed or may have mobility, and its examples include various equipments that transmit and receive user data and/or various kinds of control information to and from a base station (BS) through communication with the BS. The user equipment (UE) may be referred to as a terminal equipment (TE), a mobile station (MS), a mobile terminal (MT), a user terminal (UT), a subscriber station (SS), a wireless device, a personal digital assistant (PDA), a wireless modem, or a handheld device. Also, in the present invention, the base station (BS) means a fixed station that performs communication with a user equipment (UE) and/or another base station (BS), and exchanges various kinds of data and control information with the user equipment and/or another BS. The base station (BS) may be referred to another terminology such as an advanced base station (ABS), Node-B(NB), evolved-NodeB (eNB), a base transceiver system (BTS), an access point (AP), and a processing server (PS). In the present invention, a relay means an equipment and/or station that extends a service area of the BS or is located at a shade zone to smoothly provide a service of the BS. The relay may be referred to as another terminology such as a relay node (RN) and a relay station (RS). From a UE perspective, a relay is part of a radio access network and behaves like the BS except for some exceptions. The BS that transmits a signal to the relay or receives a signal from the relay will be referred to as a donor BS. The relay is connected with the donor BS by the wireless. From a BS perspective, the relay behaves like the user equipment UE except for some exceptions (for example, downlink control information is transmitted through R-PDCCH not PDCCH). Accordingly, the relay includes a physical layer entity used for communication with the UE and a physical layer entity used for communication with the donor BS. Transmission from the BS to the relay, which will hereinafter be referred to as BS-to-RN transmission, occurs in a downlink subframe, and transmission from the relay to the BS, which will hereinafter be referred to as RN-to-BS transmission, occurs in an uplink subframe. Meanwhile, BS-to-RN transmission and RN-to-BS transmission occur on a downlink frequency band, and RN-to-BS transmission and UE-to-RN transmission occur on an uplink frequency band. In the present invention, the relay may perform communication with a network, to which one or more BSs belong, through one or more BSs.

In the present invention, Physical Downlink Control Channel (PDCCH)/Physical Control Format Indicator Channel (PCFICH)/Physical Hybrid automatic retransmit request Indicator Channel (PHICH)/Physical Downlink Shared Channel (PDSCH) respectively mean a set of time-frequency resources or a set of resource elements, which carry Downlink Control Information (DCI)/Control Format Indicator (CFI)/downlink ACK/NACK (ACKnowlegement/Negative ACK)/downlink data. Also, Physical Uplink Control Channel (PUCCH)/Physical Uplink Shared Channel (PUSCH) respectively mean a set of time-frequency resources or a set of resource elements, which carry Uplink Control Information (UCI)/uplink data. In the present invention, time-frequency resources or resource elements (REs) allocated to or belonging to the PDCCH/PCFICH/PHICH/PDSCH/PUCCH/PUSCH will be referred to as PDCCH/PCFICH/PHICH/PDSCH/PUCCH/PUSCH REs or PDCCH/PCFICH/PHICH/PDSCH/PUCCH/PUSCH resources, respectively. Accordingly, in the present invention, PUCCH/PUSCH transmission from a UE may mean transmission of uplink control information/uplink data/random access signal on the PUSCH/PUCCH, respectively. Also, in the present invention, PDCCH/PCFICH/PHICH/PDSCH transmission from the BS may mean transmission of downlink data/control information on the PDCCH/PCFICH/PHICH/PDSCH, respectively.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols.

FIG. 1 is a diagram illustrating an example of a structure of a radio frame used in a wireless communication system. In particular, FIG. 1(a) illustrates a structure of a radio frame that may be used for FDD in a 3GP LTE(-A), and FIG. 1(b) illustrates a structure of a radio frame that may be used for TDD in a 3GPP LTE(-A).

Referring to FIG. 1, the radio frame used in the 3GPP LTE(-A) has a length of 10 ms (307200T) and includes ten (10) subframes of an equal size. Each number may be given to the ten subframes within one radio frame. In this case, $T_s$ represents a sampling time, and is expressed by $T_s=1/(2048*15 \text{ kHz})$. Each subframe has a length of 1ms and includes two slots. 20 slots within one radio frame may sequentially be numbered from 0 to 19. Each slot has a length of 0.5 ms. The time for transmitting one subframe is defined by a transmission time interval (TTI). A time resource may be identified by a radio frame number (or radio frame index), a subframe number (or subframe index), a slot number (or slot index), etc.

The radio frame may be configured differently depending on a duplex mode. For example, since downlink (DL) transmission and uplink (UL) transmission are identified by frequency in an FDD mode, the radio frame includes only one of a downlink subframe and an uplink (UL) subframe for a predetermined frequency band operated at a predetermined carrier frequency. Since DL transmission and UL transmission are identified by time in a TDD mode, the radio frame includes both a downlink subframe and an uplink (UL) subframe for a predetermined frequency band operated at a predetermined carrier frequency.

Table 1 illustrates DL-UL configuration of subframes within a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents a downlink subframe, and U represents a UL subframe, and S represents a special subframe. In particular, the special subframe includes three fields of a Downlink Pilot TimeSlot (DwPTS), a Guard Period (GP), and an Uplink Pilot TimeSlot (UpPTS). The DwPTS is a time duration reserved for DL transmission, and the UpPTS is a time duration reserved for UL transmission.

Figure 2:
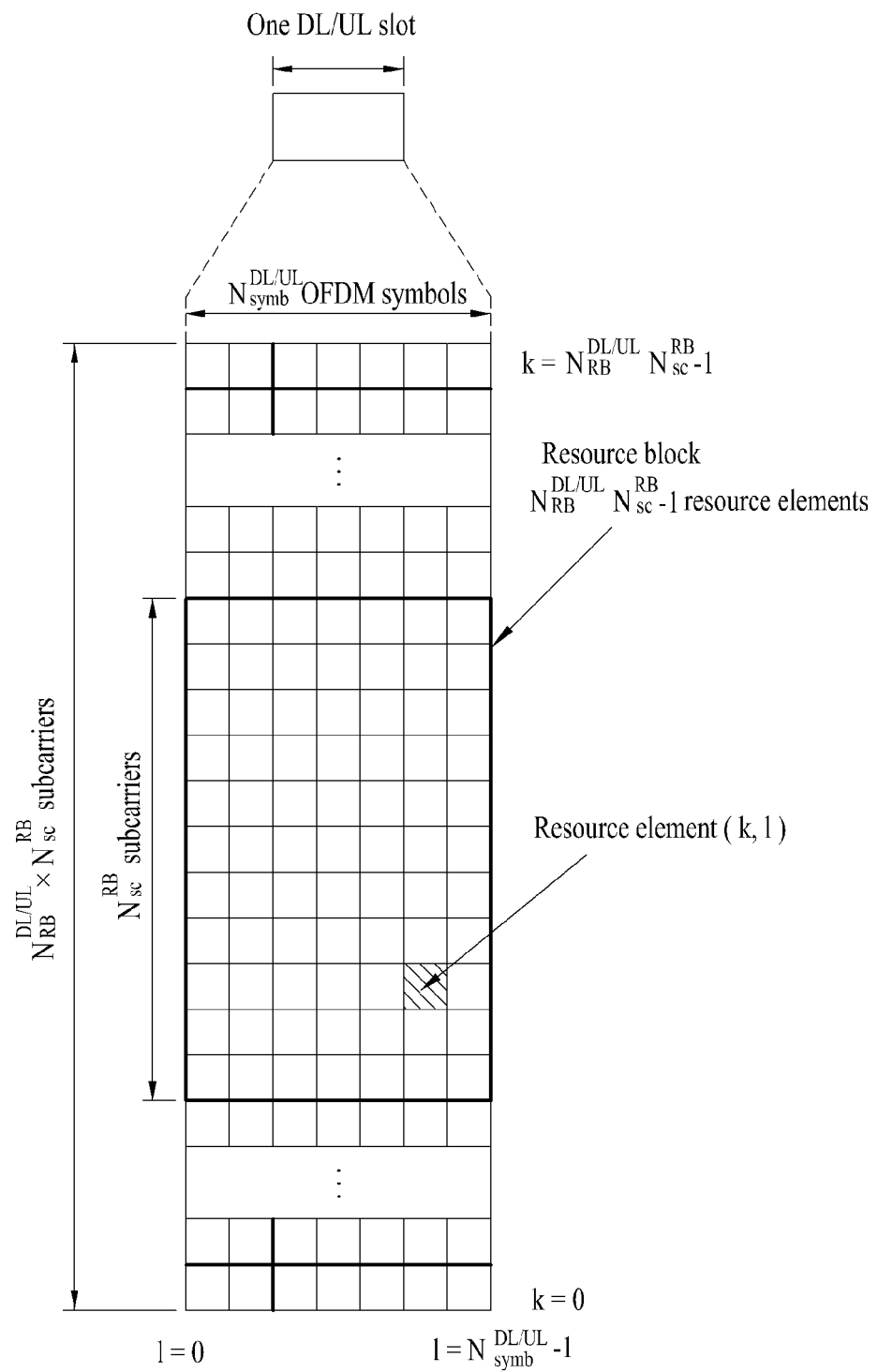
FIG. 2 is a diagram illustrating an example of a downlink/uplink (DL/UL) slot structure used in a wireless communication system.

FIG. 2 is a diagram illustrating an example of downlink/uplink (DL/UL) slot structures in a wireless communication system. In particular, FIG. 2 illustrates a structure of a resource grid in a 3GPP LTE(-A) system. One resource grid is provided per antenna port.

Referring to FIG. 2, a slot includes a plurality of orthogonal frequency division multiplexing (OFDM) symbols in a time domain, and includes a plurality of resource blocks (RBs) in a frequency domain. A OFDM symbol may denote a symbol duration. The resource block includes a plurality of subcarriers in the frequency domain. A OFDM symbol may be referred to as a SC-FDM symbol depending on multiplexing access modes. Various modifications may be made in the number of OFDM symbols included in one slot depending on channel bandwidth and CP length. For example, one slot includes seven OFDM symbols in case of normal CP but one slot includes six OFDM symbols in case of extended CP. Although FIG. 2 illustrates subframes that one slot includes seven OFDM symbols for convenience of description, the embodiments of the present invention may likewise be applied to subframes having another number of OFDM symbols not seven OFDM symbols. For reference, a resource defined by one OFDM symbol and one subcarrier will be referred to as a resource element (RE) or tone.

Referring to FIG. 2, a signal transmitted in each slot may be expressed by a resource grid, which includes $N^{DL/UL}_{RB}*N^{RB}_{sc}$ number of subcarriers and $N^{DL/UL}_{symb}$ number of OFDM symbols. In this case, $N^{DL}_{RB}$ represents the number of resource blocks (RBs) in the downlink slot, $N^{UL}_{RB}$ represents the number of resource blocks in the UL slot. $N^{DL}_{RB}$ and $N^{UL}_{RB}$ respectively depend on DL transmission bandwidth and UL transmission bandwidth. Each OFDM symbol includes $N^{DL/UL}_{RB} * N^{RB}_{sc}$ number of subcarriers in the frequency domain. A type of subcarriers may be classified into a data subcarrier for data transmission, a reference signal subcarrier for transmission of reference signal, and a null subcarrier for a guard band or a DC component. The null subcarrier for DC component is a subcarrier remained unused and is mapped into carrier frequency $f_0$ during OFDM signal generating process or frequency up-conversion process. The carrier frequency may be referred to as a center frequency. $N^{DL}_{symb}$ represents the number of OFDM symbols within a downlink slot, and $N^{UL}_{symb}$ represents the number of OFDM symbols within a UL slot. $N^{RB}_{sc}$ represents the number of subcarriers constituting one RB. One RB is defined by $N^{DL/UL}_{symb}$ number of continuous OFDM symbols in the time domain and $N^{RB}_{sc}$ number of continuous subcarriers (for example, 12 subcarriers) in the frequency domain. Accordingly, one RB is configured by $N^{DL/UL}_{symb} * N^{RB}_{sc}$ number of resource elements. Each resource element within the resource grid may be uniquely defined by a pair of indexes (k,l) within one slot. In this case, k is an index given from 0 to $N^{DL/UL}_{RB} * N^{RB}_{sc} - 1$ in the frequency domain, and/is an index given from 0 to $N^{DL/UL}_{symb} - 1$ in the time domain.

Two RBs, which occupy $N^{RB}_{sc}$ number of same consecutive subcarriers for one subframe and are respectively located at two slots of the subframe, will be referred to as a pair of physical resource blocks (PRB). The two RBs constituting the PRB have the same PRB number (or PRB index). A virtual resource block (VRB) is a logical resource allocation unit for resource allocation. The VRB has the same size as that of the PRB. A VRB may be classified into a localized VRB or a distributed VRB depending on a mapping mode of VRB into PRB. Localized VRBs are mapped directly to PRBs such that VRB number (VRB index) corresponds to PRB number. That is, $n_{PRB} = n_{VRB}$ is obtained. Localized VRBs are numbered from 0 to $N^{DL}_{VRB} - 1$, where $N^{DL}_{VRB} = N^{DL}_{RB}$. Accordingly, according to the localized mapping mode, VRBs having the same VRB number are mapped into PRBs having the same PRB number at the first slot and the second slot. On the other hand, distributed VRBs are mapped to PRBs via interleaving. Accordingly, VRBs having the same VRB number may be mapped into the PRBs having different PRB numbers at the first slot and the second slot. Two PRBs, which are respectively located at two slots of the subframe and have the same VRB number, will be referred to as VRB pair. A PRB pair and a VRB pair may be referred to as a RB pair. The RB for a UE or UE group is allocated on the basis of the VRB. Basically, the VRBs having the same VRB number are allocated to the same UE or UE group.

Figure 3:
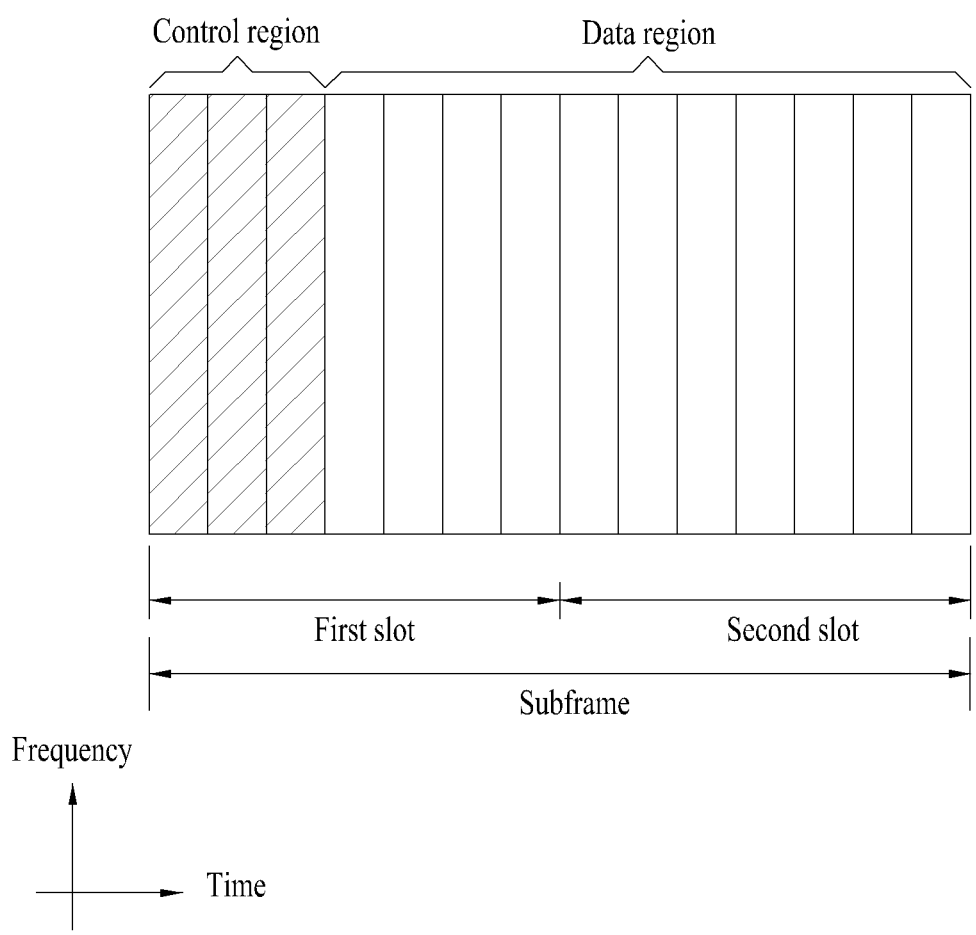
FIG. 3 is a diagram illustrating an example of a downlink subframe structure used in a 3GPP LTE(-A) system.

FIG. 3 is a diagram illustrating a structure of a downlink frame used in a 3GPP LTE(-A) system.

The downlink subframe is divided into a control region and a data region in a time domain. Referring to FIG. 3, maximum three (or four) OFDM symbols located at the front of the first slot of the subframe correspond to the control region to which a control channel is allocated. Hereinafter, a resource region available for PDCCH transmission for the downlink subframe will be referred to as a PDCCH region. The other OFDM symbols not the OFDM symbols used for the control region correspond to the data region to which a physical downlink shared channel (PDSCH) is allocated. Hereinafter, a resource region available for PDSCH transmission for the downlink subframe will be referred to as a PDSCH region. Examples of the downlink control channel used in the 3GPP LTE include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and carries information on the number of OFDM symbols used for transmission of the control channel within the subframe. The PHICH carries HARQ ACK/NACK (acknowledgement/negative-acknowledgement) signal in response to uplink transmission.

The control information transmitted through the PDCCH will be referred to as downlink control information (DCI). The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual UEs within a UE group, Tx power control information, and activity information of voice over Internet protocol (VoIP). The size and usage of the DCI carried by one PDCCH are varied depending on DCI formats. The size of the DCI may be varied depending on a coding rate. In the current 3GPP LTE system, various formats are defined, wherein format 0 is defined for an uplink, and formats 1, 1A, 1B, 1C, 1D, 2, 2A, 3, and 3A are defined for a downlink. Combination selected from control information such as a hopping flag, RB allocation, modulation coding scheme (MCS), redundancy version (RV), new data indicator (NDI), transmit power control (TPC), cyclic shift, cyclic shift demodulation reference signal (DMRS), UL index, channel quality information (CQI) request, DL assignment index, HARQ process number, transmitted precoding matrix indicator (TPMI), precoding matrix indicator (PMI) information is transmitted to the UE as the downlink control information. Table 2 illustrates an example of the DCI format.

TABLE 2

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact resource assignments for PDSCH using rank-1 closed loop precoding |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 3/3A | Power control commands for PUCCH and PUSCH with 2-bit/1-bit power adjustments |

In the 3GPP LTE(-A) system, various resource allocation (RA) types (for example, type 0 RA, type 1 RA, type 2 RA, etc.) are defined. The formats 1, 2 and 2A are used for the type 0 RA or type 1 RA, and the formats 1A, 1B, 1C and 1D are used for the type 2 RA. The RB allocation information in the type 0 RA includes a bitmap that indicates a resource block group (RBG) allocated to the UE. The RBG is a set that includes one or more continuous PRBs. The size of the RBG depends on a system bandwidth. In the type 1 RA, RB allocation information indicates resources within RBG subset for the scheduled UE in a unit of PRB. In the type 2 RA, RB allocation information indicates a set of VRBs continuously allocated to the scheduled UE.

A plurality of PDCCHs may be transmitted within a control region. The UE may monitor the plurality of PDCCHs. The BS determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channel (that is, PDFICH and PHICH). The number of DCI formats and DCI bits is determined in accordance with the number of CCEs. For example, four DCI formats are supported as illustrated in Table 3.

TABLE 3

| DCI format | Number of CCEs (n) | Number of REGs | Number of DCI bits |
|---|---|---|---|
| 0 | 1 | 0 | 72 |
| 1 | 2 | 18 | 144 |
| 2 | 3 | 36 | 288 |
| 3 | 4 | 72 | 576 |

CCEs are numbered and used consecutively. In order to simplify a decoding process, the PDCCH having a format that includes n number of CCEs may only start on a CCE fulfilling a CCE number corresponding to a multiple of n. The number of CCEs used for transmission of a specific PDCCH is determined by the BS in accordance with a channel status. For example, one CCE may be required for a PDCCH for a UE (for example, adjacent to BS) having a good downlink channel. However, in case of a PDCCH for a UE (for example, located near the cell edge) having a poor channel, eight CCEs may be required to obtain sufficient robustness. Also, a power level of the PDCCH may be adjusted to correspond to a channel status.

In case of the 3GPP LTE system, a set of CCEs where the PDCCH may be located has been defined for each UE. A set of CCEs where the UE may detect its PDCCH will be referred to as a PDCCH search space, simply search space (SS). An individual resource through which the PDCCH may be transmitted within the search space will be referred to as a PDCCH candidate. A set of PDCCH candidates to be monitored by the UE will be defined as a search space. One PDCCH candidate corresponds to 1, 2, 4 or 8 CCEs in accordance with a CCE aggregation level. The BS transmits actual PDCCH (DCI) on a PDCCH candidate in the search space, and the UE monitors the search space to detect the PDCCH (DCI). In more detail, the UE attempts blind decoding for the PDCCH candidates within the search space.

In the 3GPP LTE system, search spaces for respective PDCCH formats may have different sizes, and are defined as a dedicated search space and a common search space. The dedicated search space is a UE-specific search space, and is configured for each UE. The common search space is configured for a plurality of UEs. Information on the common search space is provided to all the UEs. Table 4 illustrates aggregation levels that define the search spaces.

TABLE 4

| | Search space | | Number of PDCCH |
|---|---|---|---|
| Type | Aggregation level | Size [in CCEs] | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The UE that has detected its PDCCH by monitoring the corresponding search space in accordance with each aggregation level decodes the PDSCH in the data region of the downlink subframe on the basis of the DCI carried by the detected PDCCH and/or transmits the PUSCH in the data region of the uplink subframes.

A plurality of PDCCHs for a plurality of UEs may be transmitted within a PDCCH region of the same subframe. The BS does not provide the UE with exact information on where the corresponding PDCCH is located within the PDCCH region. Accordingly, the UE searches for its PDCCH by monitoring a set of PDCCH candidates within the subframe. In this case, monitoring means that the UE attempts to decode each of the received PDCCHs in accordance with each DCI format. This will be referred to as blind decoding. Through blind decoding, the UE simultaneously performs identification of the PDCCH transmitted thereto and decoding of control information transmitted through the corresponding PDCCH. For example, if the UE performs demasking for its PDCCH with C-RNTI and no CRC error is detected from the corresponding PDCCH, it is considered that the UE detects its PDCCH. Meanwhile, in order to reduce overhead of blind decoding, the number of DCI formats is defined to be smaller than types of control information transmitted using the PDCCH. The DCI format includes a plurality of different information fields. The types of information fields, the number of information fields, and the number of bits of each information field are varied depending on the DCI format. Also, the size of the control information matched with the DCI format is varied depending on the DCI format. A DCI format may be used for transmission of two or more kinds of control information.

Table 5 illustrates an example of control information transmitted in accordance with a DCI format 0. In Table 5, a bit size of each information field is only exemplary, and is not limited as follows.

TABLE 5

| Information Field | bit(s) |
| --- | --- |
| (1) Flag for format 0/format 1A differentiation | 1 |
| (2) Hopping flag | 1 |
| (3) Resource block assignment and hopping resource allocation | ceil{log$_2$(N$^{UL}_{RB}$(N$^{UL}_{RB}$ + 1)/2)} |
| (4) Modulation and coding scheme and redundancy version | 5 |
| (5) New data indicator | 1 |
| (6) TPC command for scheduled PUSCH | 2 |
| (7) Cyclic shift for DMRS | 3 |
| (8) UL index (TDD) | 2 |
| (9) CQI request | 1 |

The flag field is an information field for identifying format 0 from format 1A. In other words, the DCI formats 0 and 1A have the same payload size and are identified from each other by the flag field. A bit size of the resource block assignment and hopping resource allocation field may be varied depending on hopping PUSCH or non-hopping PUSCH. The resource block assignment and hopping resource allocation field for the non-hopping PUSCH provides ceil $\{\log_2(N^{UL}_{RB}(N^{UL}_{RB}+1)/2)\}$ bit(s) for resource allocation of the first slot within the uplink subframe, wherein $N^{UL}_{RB}$ is the number of resource blocks included in the uplink slot and is dependent on an uplink transmission bandwidth set in the cell. Accordingly, the payload size of the DCI format 0 may be varied depending on the uplink bandwidth. The DCI format 1A includes an information field for PDSCH allocation, and the payload size of the DCI format 1A may be varied depending on the downlink bandwidth. The DCI format 1A provides a reference information bit size for the DCI format 0. Accordingly, if the number of information bits of the DCI format 0 is smaller than the number of information bits of the DCI format 1A, '0' is added to the DCI format 0 until the payload size of the DCI format 0 is the same as that of the DCI format 1A. The added '0' is filled in a padding field of the DCI format.

In the meantime, in order to maintain operation load based on blind decoding at a certain level or less, not all the DCI formats are searched at the same time. For example, the UE is configured semi-statically by upper layer signaling to receive PDSCH data signaled through the PDCCH in accordance with one of transmission modes 1 to 9. Table 6 illustrates a transmission mode for configuring multi-antenna technology and a DCI format where the UE performs blind decoding in accordance with the corresponding transmission mode.

TABLE 6

| Transmission mode | DCI format | Search Space | Transmission scheme of PDSCH corresponding to PDCCH |
| --- | --- | --- | --- |
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |

TABLE 6-continued

| Transmission mode | DCI format | Search Space | Transmission scheme of PDSCH corresponding to PDCCH |
|---|---|---|---|
| | DCI format 2C | UE specific by C-RNTI | Up to 8 layer transmission, ports 7-14 |

In particular, Table 6 illustrates a relation between PDSCH and PDCCH configured by C-RNTI. The UE configured to decode the PDCCH with CRC scrambled in C-RNTI by an upper layer decodes the PDCCH and also decodes the corresponding PDSCH in accordance with each combination defined in Table 6. For example, if the UE is configured in a transmission mode 1 by upper layer signaling, the UE acquires DCI by respectively decoding the PDCCH through the DCI format 1A and 1.

Transmission and reception of the PDCCH will be described in more detail. The BS generates control information in accordance with the DCI format. The BS may select one of a plurality of DCI formats (DCI formats 1, 2, ..., N) in accordance with control information to be transmitted to the UE. The BS attaches cyclic redundancy check (CRC) for error detection to the control information generated in accordance with each DCI format. The CRC is masked with an identifier (for example, radio network temporary identifier (RNTI)) depending on owner or usage of the PDCCH. In other words, the PDCCH is CRC scrambled with the identifier (for example, RNTI). If the C-RNTI is used, the PDCCH carries the control information for the corresponding specific UE. If the other RNTI (for example, P-RNTI, SI-RNTI, RA-RNTI) is used, the PDCCH carries common control information received by all the UEs within the cell. The BS generates coded data by performing channel coding for CRC added control information. The BS performs rate matching based on the CCE aggregation level allocated to the DCI format, and generates modulation symbols by modulating the coded data. The modulation symbols constituting one PDCCH may have a CCE aggregation level of one of 1, 2, 4, and 8. The modulation symbols are mapped into physical resource elements (CCE to RE mapping). The UE performs demapping of physical resource elements into CCEs (CCE to RE demapping). Since the UE does not know what CCE aggregation level should be used to receive the PDCCH, the UE performs demodulation for each CCE aggregation level. The UE performs rate dematching for the demodulated data. Since the UE does not know what DCI format (or DCI payload size) of control information should be received therein, the UE performs rate dematching for each of DCI formats (or DCI payload size) of a corresponding transmission mode. The UE performs channel decoding for the rate dematched data in accordance with a code rate, and detects whether an error has occurred, by checking CRC. If an error has not occurred, the UE may be determined that the UE will detect its PDCCH. If the error has occurred, the UE continues to perform blind decoding for the other CCE aggregation level or the other DCI format (or DCI payload size). The UE that has detected its PDCCH removes CRC from the decoded data and acquires control information.

In the meantime, for helping a UE demodulates PDCCH and/or PDSCH correctly, a BS transmits a reference signal (RS) for channel status estimation, signal demodulation and etc. A RS means a specific waveform signal which is predefined and known between the UE and the BS, and may be referred to as a pilot.

Figure 4:
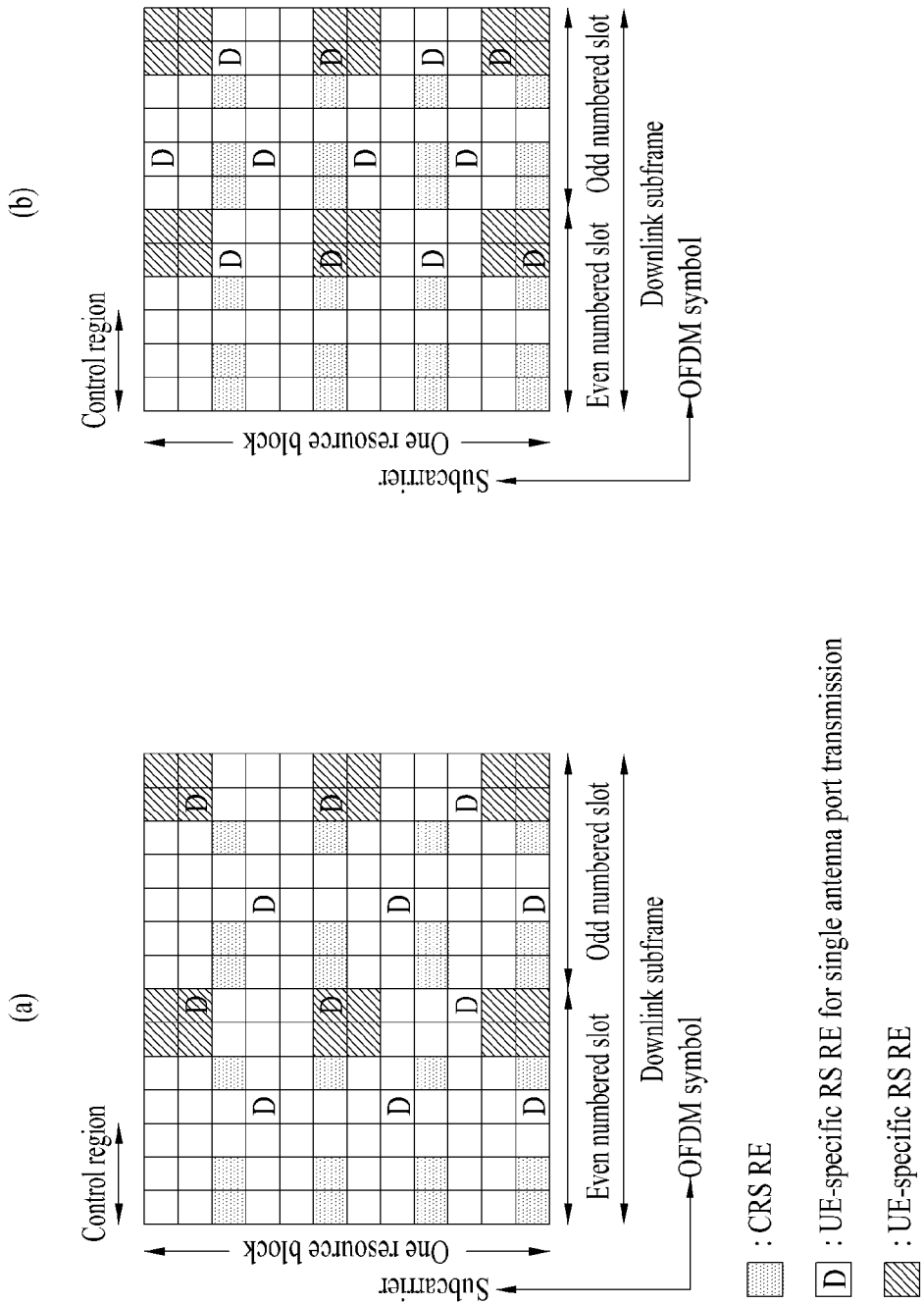
FIG. 4 is a diagram illustrating an example of a reference signal used in a 3GPP LTE(-A) system.

FIG. 4 is a diagram illustrating an example of a reference signal used in a 3GPP LTE(-A) system. In particular, FIG. 4(a) illustrates a location of RS resources for a subframe having a normal CP, and FIG. 4(b) illustrates a location of RS resources within a subframe having an extended CP.

The RSs may be classified into a dedicated reference signal (DRS) and a common reference signal (CRS). The RSs may be classified into a reference signal for demodulation and a reference signal for channel measurement. The CRS and the DRS may be referred to as a cell-specific RS and a demodulation RS (DMRS), respectively. Also, the DMRS may be referred to as UE-specific RS. Although the DMRS and the CRS may be transmitted together, only one of the DMRS and the CRS may be transmitted. However, if the DMRS is transmitted without the CRS, since the DMRS transmitted using the same precoder as that of data may be used for demodulation only, the RS For channel measurement should be provided separately. For example, in order to make it possible that a UE measures channel status information, the 3GPP LTE(-A) introduces a CSI-RS which is transmitted to the UE additionally (not shown). The CSI-RS is transmitted per predetermined period of a plurality of subframes, unlike the CRS which is transmitted per subframe, on the basis of the fact that time based variation of the channel status is not great relatively.

In FIG. 4, CRS REs represent REs of which antenna ports 0 to 4 are used for CRS transmission. The CRS is transmitted within all the downlink subframes within a cell supporting PDSCH transmission. The CRS may be used for both demodulation and measurement and the CRS is used commonly by all the UEs within the cell. CRS sequence is transmitted from every antenna port regardless of the number of layers.

In FIG. 4, REs marked with D represents REs used for RS transmission of demodulation of the PDSCH if the BS performs PDSCH transmission through a single antenna port. In FIG. 4, UE-specific RS REs are used for RS transmission for demodulation of the PDSCH through maximum eight antenna ports. The BS transmits a UE-specific RS to the REs if data demodulation is required, and the presence of the UE-specific RS is notified to the UE through the upper layer.

Figure 5:
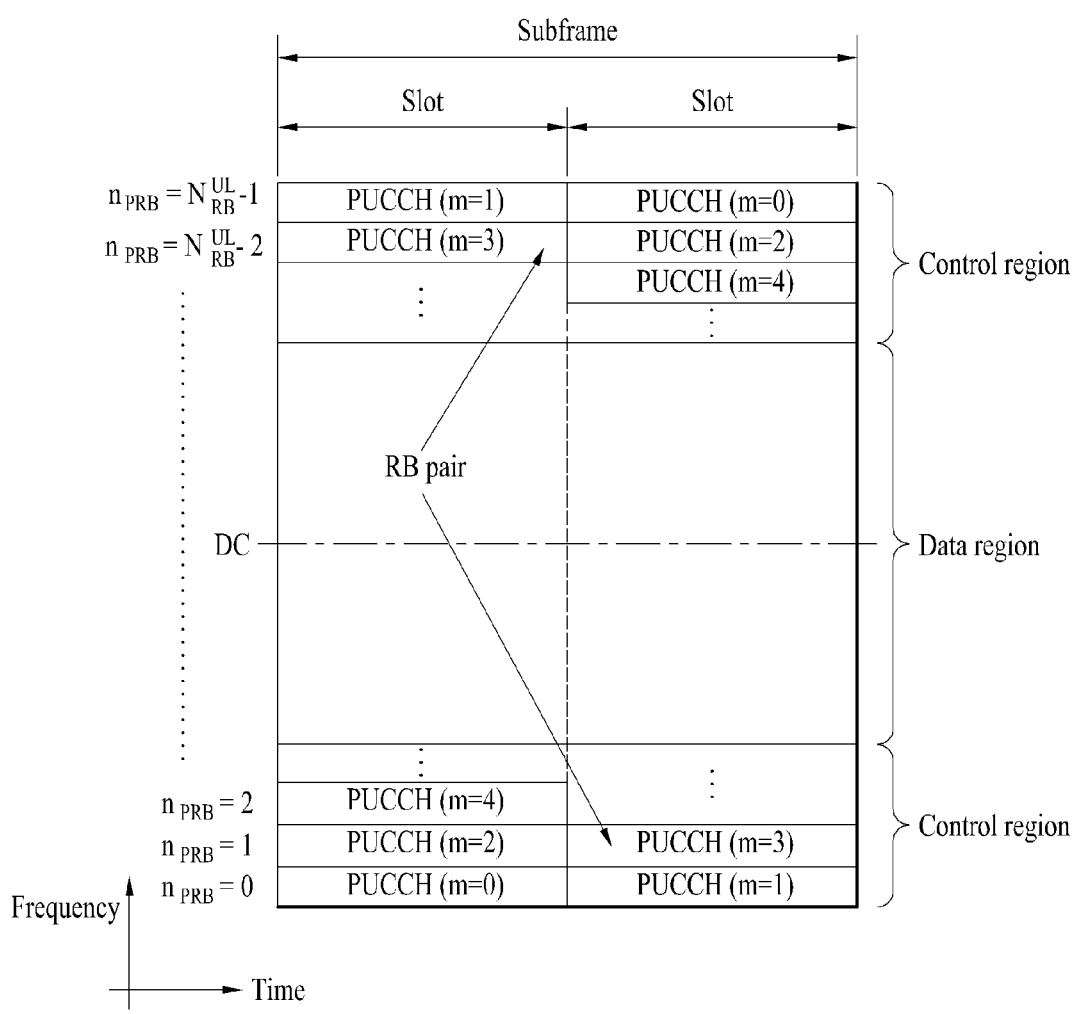
FIG. 5 is a diagram illustrating an example of an uplink subframe structure used in a 3GPP LTE(-A) system.

FIG. 5 is a diagram illustrating an example of an uplink subframe structure used in a 3GPP LTE(-A) system.

Referring to FIG. 5, the uplink subframe may be divided into a control region and a data region in a frequency domain. One or several physical uplink control channels (PUCCHs) may be allocated to the control region to carry uplink control information (UCI). The size and usage of the UCI carried by one PUCCH are varied depending on a PUCCH format, and the size of the UCI may be varied depending on a coding rate.

One or several physical uplink shared channels (PUSCHs) may be allocated to the data region of the uplink subframe to carry user data. If the UE adopts SC-FDMA scheme for uplink transmission, the PUCCH and the PUSCH cannot be transmitted on one carrier at the same time in the 3GPP LTE release 8 or 9 system to maintain single carrier features. In the 3GPP LTE release 10 system, simultaneous transmission of the PUCCH and the PUSCH may be indicated by the upper layer.

In the uplink subframe, subcarriers away from direct current (DC) subcarrier are used as the control region. In other words, the subcarriers located at both ends of the uplink transmission bandwidth are allocated for transmission of uplink control information. The DC subcarrier is a component remaining without being used for signal transmission, and is mapped into a carrier frequency $f_0$ during frequency up-conversion. The PUCCH for one UE is allocated to a pair of RBs belonging to the resources operated at one carrier frequency for one subframe, and RBs belonging to the pair of RBs occupy different subcarriers from each other at two slots. The PUCCH allocated as above will be expressed as that the pair of RBs allocated to the PUCCH is subjected to frequency hopping at the slot edge. However, if frequency hopping is not applied to the RB pair, the RBs forming the RB pair occupy the same subcarriers at the two slots.

Figure 6:
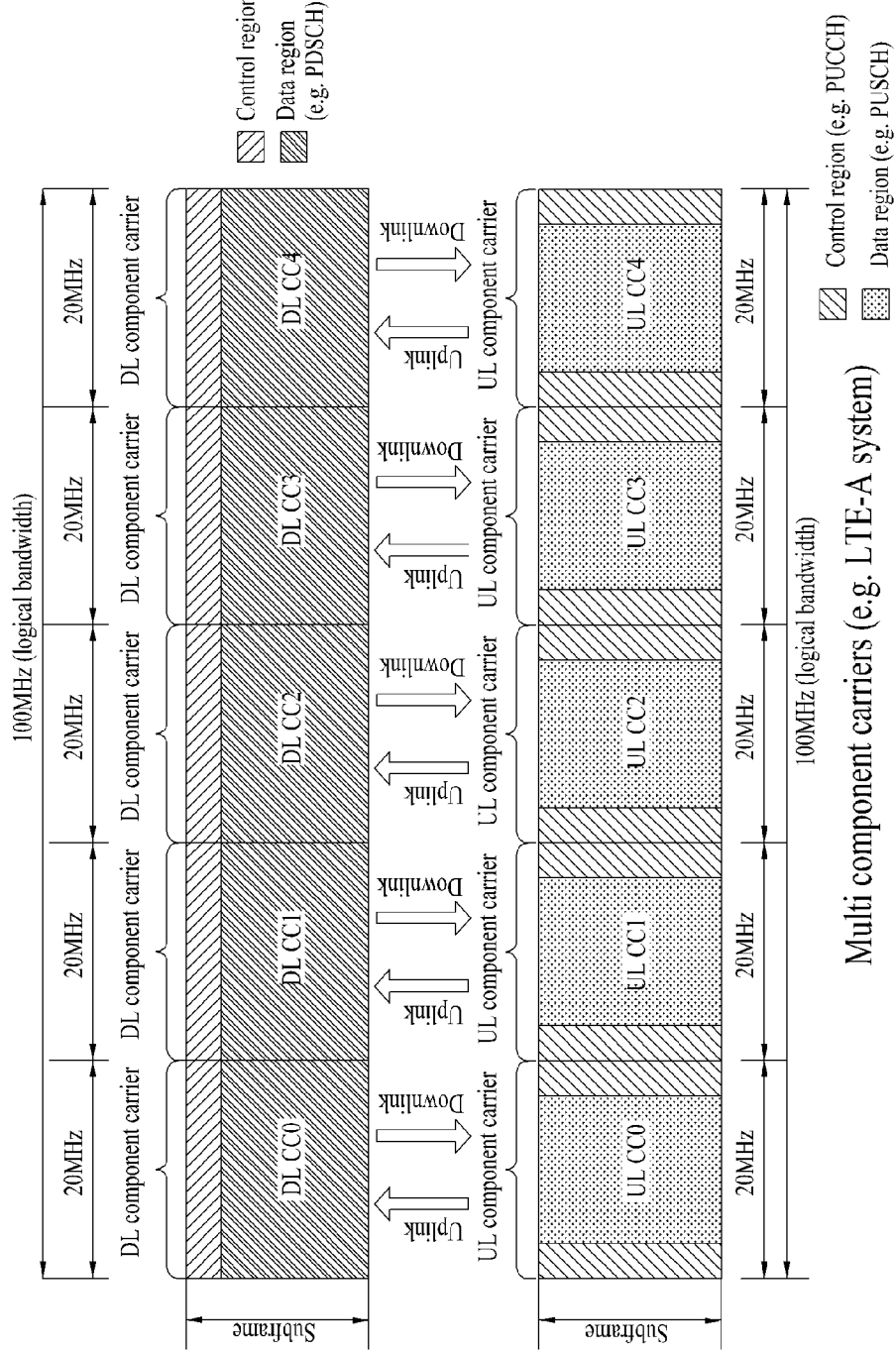
FIG. 6 is a diagram illustrating an example of communication performed by aggregation of multiple carriers.

FIG. 6 is a diagram illustrating an example of communication performed by aggregation of multiple carriers.

A general wireless communication system performs data transmission and reception through one downlink (DL) band and one uplink (UL) band corresponding to the downlink band (in case of a frequency division duplex (FDD) mode), or divides a predetermined radio frame into an uplink time unit and a downlink time unit in a time domain and performs data transmission and reception through the uplink and downlink time units (in case of a time division duplex (TDD) mode). However, in the recent wireless communication system, the introduction of the carrier aggregation (or bandwidth aggregation) technology, which uses greater uplink and downlink bandwidths by aggregating a plurality of uplink and downlink frequency blocks, has been discussed to utilize a wider frequency band. The carrier aggregation technology is different from the orthogonal frequency division multiplexing (OFDM) system in that downlink or uplink communication is performed using a plurality of carrier frequencies. In the OFDM system, downlink or uplink communication is performed using a carrier frequency of which basic frequency band is divided into a plurality of subcarriers. Referring to FIG. 6, five component carriers (CCs) of 20 MHz may be aggregated in each of the uplink and downlink to support a bandwidth of 100 MHz. The respective CCs may adjoin each other or not in the frequency domain. Although FIG. 6 illustrates that a bandwidth of UL CC and a bandwidth of DL CC are the same as each other and are symmetrical to each other, a bandwidth of each component carrier may be defined independently. Also, symmetric carrier aggregation where the number of UL CCs is different from the number of DL CCs may be configured. A DL/UL CC for a specific UE may be referred to as a serving UL/DL CC configured at the specific UE.

The BS may activate all or some of the serving CCs configured in the UE or deactivate some of the serving CCs for communication with the UE. The BS may change the activated/deactivated CC, and may change the number of CCs which is/are activated or deactivated. If the BS allocates available CCs to the UE cell-specifically or UE-specifically, at least one of the allocated CCs is not deactivated unless CC allocation to the UE is fully reconfigured or unless the UE performs handover. Such CC which is not deactivated unless CC allocation to the UE is full reconfigured will be referred to as a primary CC (PCC), and CC which may be activated/deactivated freely by the BS will be referred to as secondary CC (SCC). The PCC and the SCC may be identified from each other on the basis of the control information. For example, specific control information may be set to be transmitted and received through a specific CC only. This specific CC may be referred to as the PCC, and the other CCs may be referred to as SCCs.

In the meantime, the 3GPP LTE(-A) system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (PCell) or PCC, and a cell operating on a secondary frequency may be referred to as a secondary cell (SCell) or SCC. The carrier corresponding to the PCell on the downlink will be referred to as downlink primary CC (DL PCC), and the carrier corresponding to the PCell on the uplink will be referred to as uplink primary CC (UL PCC). A SCell means a cell that may be configured after completion of RRC connection establishment and used to provide additional radio resources. The SCell may form a set of serving cells for the UE together with the PCell in accordance with capabilities of the UE. The carrier corresponding to the SCell on the downlink will be referred to as downlink secondary CC (DL SCC), and the carrier corresponding to the SCell on the uplink will be referred to as uplink secondary CC (UL SCC). Although the UE is in RRC-CONNECTED state, if it is not configured by carrier aggregation or does not support carrier aggregation, a single serving cell configured by the PCell only exists.

For reference, the term "cell" used for carrier aggregation is distinguishable from the term "cell" indicating a certain local area where a communication service is provided by one BS or one antenna group. In order to differentiate the "cell" indicating a certain local area from the "cell" used for carrier aggregation, in the present invention, the "cell" for carrier aggregation will be referred to as CC, whereas the "cell" for the local area will be simply referred to as cell.

The introduction of remote radio head (RRH) has been newly discussed to improve system throughput. Also, since a plurality of serving component carriers (CCs) may be configured for one UE under carrier aggregation, a method for transmitting UL/DL grant for other CC from a serving CC having good channel status has been discussed. If a CC carrying scheduling information, that is, UL/DL grant is different from a CC through which UL/DL transmission corresponding to the UL/DL grant is performed, it will be referred to as cross-carrier scheduling. In the cross-carrier scheduling, the CC used for transmission of UL/UL grant will be referred to as scheduling CC, and CC used for UL/DL transmission based on the UL/DL grant will be referred to as scheduled CC. The UL/DL grant may include information indicating the corresponding scheduled CC. The amount of the PDCCH to be transmitted from the BS is gradually increased due to introduction of the RRH technology and the cross-carrier scheduling technology. However, since the size of the PDCCH region on which the PDCCH may be transmitted is the same as that of the related art, PDCCH transmission acts as bottleneck of system throughput. Accordingly, in order to prevent the PDCCH transmission from restricting system throughput, PDCCH transmission utilizing PDSCH region of the DL subframe is considered.

Figure 7:
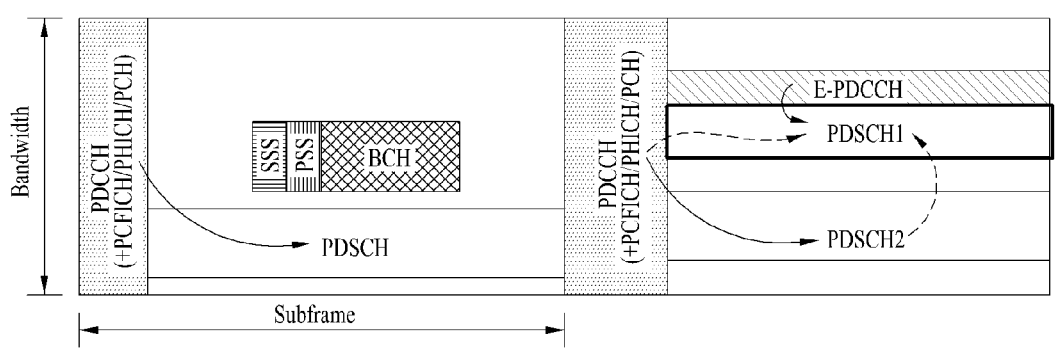
FIG. 7 is a diagram illustrating an example of a PDCCH allocated to a data region of a downlink subframe.

FIG. 7 is a diagram illustrating an example of a PDCCH allocated to a data region of a downlink subframe.

Referring to FIG. 7, the PDCCH based on the existing 3GPP LTE standard may be allocated to the PDCCH region of the subframe. Meanwhile, the PDCCH may additionally be allocated using some resource of the PDSCH region. If the PDCCH is transmitted in the PDSCH region, this PDCCH may be used for CRS based transmission diversity or spatial multiplexing transmission and may be operated based on DMRS which is a UE-specific reference signal. Hereinafter, in order to differentiate an existing PDCCH, which is transmitted in start OFDM symbol(s) of the DL subframe, from a PDCCH transmitted in PDSCH region of the DL subframe, the latter PDCCH will be referred to as an enhanced PDCCH (E-PDCCH) or an advanced PDCCH (A-PDCCH).

Referring to FIG. 7, PDSCH1 based on the E-PDCCH may be transmitted from the BS to the UE by using physical layer information or upper layer information, which is transmitted through the existing PDCCH and PDSCH2 based on the PDCCH. The UE configured to receive the E-PDCCH may be configured to receive all or some of the existing primary synchronization signal (PSS), secondary synchronization signal (SSS), a broadcast channel (BCH), or PCIFICH, PHICH, and paging channel (PCH).

The PDSCH scheduled by the E-PDCCH may be referred to as E-PDSCH. Also, in order to identify the system that includes both the PDCCH and the E-PDCCH from the system that includes the PDCCH only without the E-PDCCH, the latter system will be referred to as a legacy system. In the embodiments of the present invention, it is assumed that the UE implemented in accordance with the advanced system, that is, the advanced UE can be implemented to receive both the PDCCH and the E-PDCCH. The UE implemented to receive the PDCCH only will be a legacy UE as compared with the UE implemented to receive the E-PDCCH. Hereinafter, for the UE or relay configured to be able to receive the PDCCH and the E-PDCCH, a method for coexisting PDCCH and E-PDCCH in a radio frame will be suggested.

<E-PDCCH Search Space Configuration Information>

Figure 8:
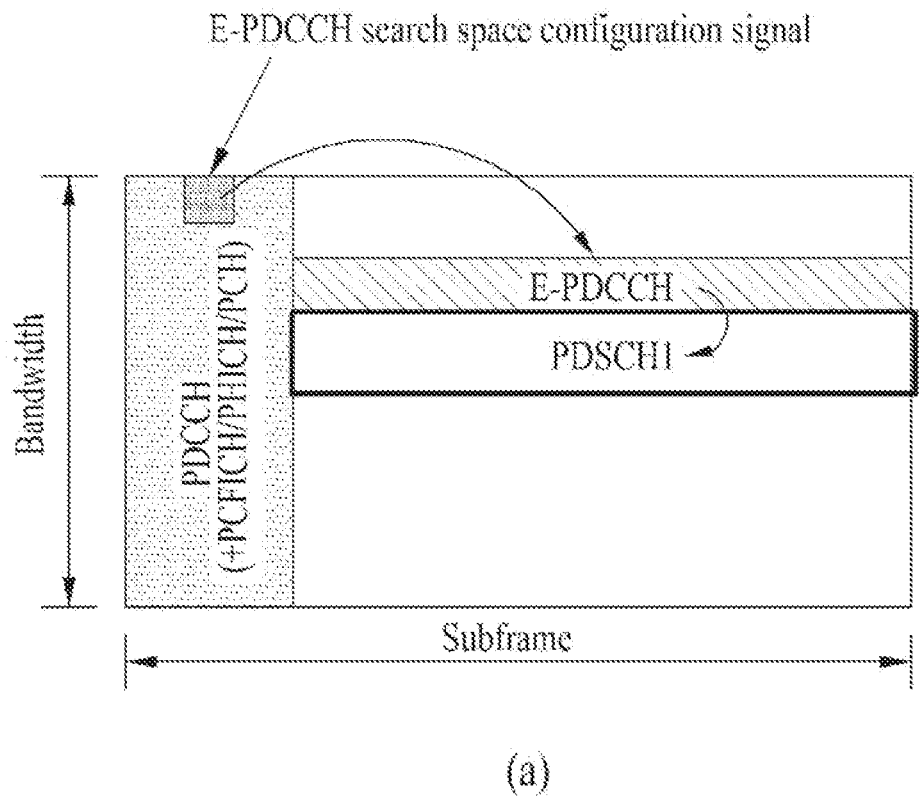
FIG. 8 is a diagram illustrating transmission and reception of information on an E-PDCCH search space in accordance with one embodiment of the present invention.
Figure 8:
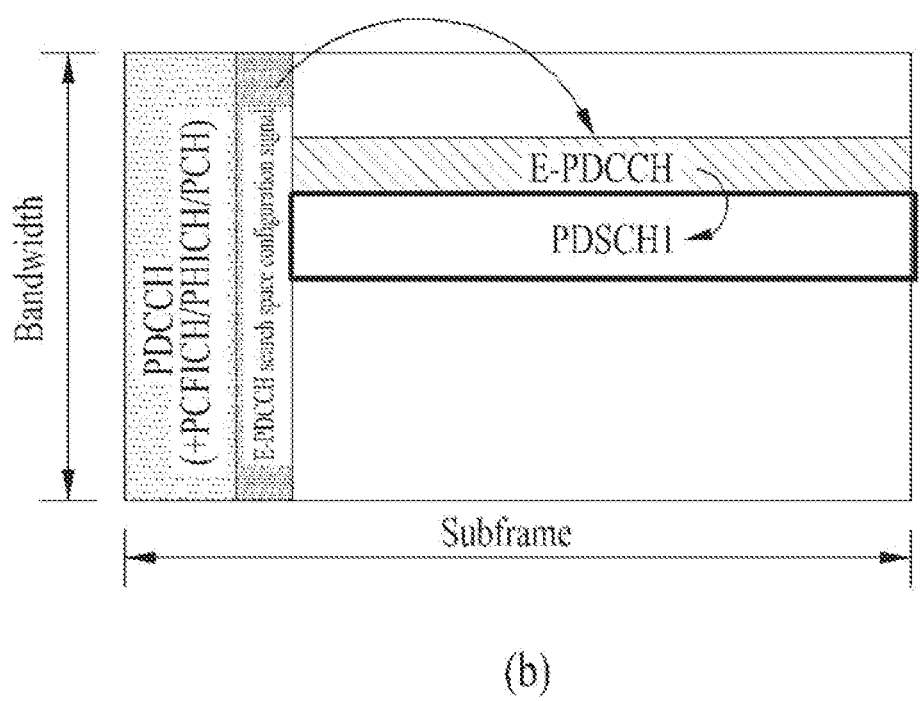

FIG. 8 is a diagram illustrating transmission and reception of information on an E-PDCCH search space in accordance with one embodiment of the present invention.

The present invention suggests that a search space (hereinafter, referred to as E-PDCCH search space) for E-PDCCH will be provided to a UE by using a PDCCH. The E-PDCCH search space may be indicated to the UE by RRC signaling. However, in this case, problems occur in that it is difficult to dynamically change the E-PDCCH search space, and a handover procedure from a cell not providing E-PDCCH to a cell providing E-PDCCH may be inconvenient. Accordingly, in one embodiment of the present invention, information (hereinafter, referred to as E-PDCCH search space configuration information) on the E-PDCCH search space is transmitted/received using the DCI format.

Referring to FIG. 8(a), the introduction of a PDCCH of a new format (hereinafter, referred to as compact PDCCH (C-PDCCH)), which carries the E-PDCCH space configuration information, may be considered as one method for implementing this embodiment. The UE is configured to perform additional blind decoding for the C-PDCCH to know where the E-PDCCH search space is. The C-PDCCH may be located at the existing search space (hereinafter, referred to as PDCCH search space) for the PDCCH, and it may be located in a separate compact common/UE-specific search space. However, the UE that may receive the PDCCH and the E-PDCCH at the same time should be configured to set a mode. For example, whether the UE should monitor the PDCCH and the E-PDCCH at the same time may be configured in advance. Alternatively, which channel of the PDCCH and the E-PDCCH should be monitored for what subframe (time) may be configured in advance. The advanced UE may be configured to monitor both the PDCCH and the E-PDCCH at the same time, or may be configured to monitor one of the PDCCH and the E-PDCCH for a specific subframe. Meanwhile, if carrier aggregation is configured, the C-PDCCH includes information on the search space on the SCC as well as information on the search space on the PCC. It is assumed that the SCC search space exists in the PDSCH region of the PCC.

Referring to FIG. 8(b), as another method for implementing this embodiment, although the existing PDCCH format is maintained as it is, addition of new RNTI called E-PDCCH RNTI may be considered. In other words, E-PDCCH search space configuration information may be transmitted and received through the existing PDDCH with being masked with E-PDCCH RNTI. The BS may be configured to transmit the PDCCH carrying the E-PDCCH search space configuration information in the existing PDCCH region to the UE by masking the E-PDCCH with RNTI. The UE may be configured to acquire the E-PDCCH search space configuration information by demasking the PDCCH with E-PDCCH RNTI.

In this embodiment, information transmitted through the C-PDCCH or the existing PDCCH may include additional information as follows, as well as the E-PDCCH search space configuration information.

FDD subframe configuration pattern (for example, 8-bit map)

TDD subframe configuration index

Resource allocation type {0, 1, 2L, 2D}

RA (resource allocation) bitmap {0/1, 2}

PDCCH start symbol

PUCCH resource

In addition to the aforementioned information, location information on a start and end of the E-PDCCH or PDSCH, that is, information indicating OFDM symbol from or at which the E-PDCCH or PDSCH starts or ends may be included in the additional information.

This embodiment may be applied to transmission and reception between the BS and the relay as well as transmission and reception between the BS and the UE. In this case, the additional information transmitted through the C-PDCCH or the existing PDCCH may include DMRS or CRS information based on interleaving or non-interleaving.

The following Table 7 illustrates E-PDCCH related signaling information transmitted and received through the C-PDCCH or the existing PDCCH.

TABLE 7

E-PDCCH SubframeConfig information element

```
--ASN1START
E-PDCCH SubframeConfig-r10 ::=      SEQUENCE {
    subframeConfigPattern-r10       CHOICE {
        subframeConfigPatternFDD-r10    BIT STRING (SIZE(8)),
        subframeConfigPatternTDD-r10    INTEGER (0..31)
    },
    epdcch-Config-r10               SEQUENCE {
        resourceAllocationType-r10      ENUMERATED      {type0,     type1,
type2Localized, type2Distributed},
        resourceBlockAssignment-r10     CHOICE {
            type01-r10                  CHOICE {
                nrb6-r10                    BIT STRING (SIZE(6)),
                nrb15-r10                   BIT STRING (SIZE(8)),
                nrb25-r10                   BIT STRING (SIZE(13)),
                nrb50-r10                   BIT STRING (SIZE(17)),
                nrb75-r10                   BIT STRING (SIZE(19)),
                nrb100-r10                  BIT STRING (SIZE(25))
            },
            type2-r10                   CHOICE {
                nrb6-r10                    BIT STRING (SIZE(5)),
                nrb15-r10                   BIT STRING (SIZE(7)),
                nrb25-r10                   BIT STRING (SIZE(9)),
                nrb50-r10                   BIT STRING (SIZE(11)),
                nrb75-r10                   BIT STRING (SIZE(12)),
                nrb100-r10                  BIT STRING (SIZE(13))
            }
        },
        demodulationRS-r10              CHOICE {
            interleaving-r10                ENUMERATED {crs},
            noInterleaving-r10              ENUMERATED {crs, dmrs}
        },
        pdsch-Start-r10             INTEGER (1..3),
        pucch-Config-r10            SEQUENCE {
            n1-PUCCH-AN-port0-r10       INTEGER (0..2047),
            n1-PUCCH-AN-port1-r10       INTEGER (0..2047)
        },
        ...
    }                                                               OPTIONAL, --
Need ON
    ...
}
--ASN1STOP
```

The aforementioned information may be transmitted through medium access control (MAC) signaling as well as through the C-PDCCH or the existing PDCCH.

Figure 9:
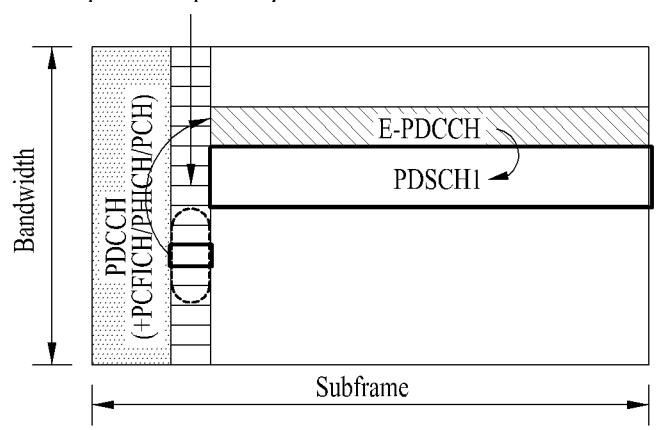
FIG. 9 is a diagram illustrating transmission and reception of information on an E-PDCCH search space in accordance with another embodiment of the present invention.

FIG. 9 is a diagram illustrating transmission and reception of information on an E-PDCCH search space in accordance with another embodiment of the present invention.

Super compact DCI (hereinafter, referred to as SC DCI) format indicating the location of the E-PDCCH search space may be transmitted and received in a specific symbol and specific resource region. The SC DCI may be transmitted and received through the PDCCH or PDSCH. The SC DCI may be subjected to blind decoding on the basis of UE ID. Since the main purpose of the SC DCI indicates the E-PDCCH search space, the SC DCI may be configured in a very compact type. Accordingly, CCE for SC DCI transmission includes resources smaller than CCE (hereinafter, referred to as legacy CCE) of the existing PDCCH, which includes nine REGs. Hereinafter, the CCE for the SC DCI will be referred to as mini CCE. For example, one mini CCE may include DCI format of a size of three or four REGs that include E-PDCCH VRB set address or number. Referring to FIG. 9, all RBs or specific RBs within the third or fourth OFDM symbol may be defined as a new search space for the SC DCI transmitted and received on the mini CCE that is configured with four REGs.

According to this embodiment, since the E-PDCCH search space may be configured dynamically by the SC DCI, the capacity of the PDCCH may be increased. Also, according to the present invention, since the mini CCE is used for transmission of the E-PDCCH search space configuration information, a communication service may be provided to more UEs by using a limited radio resource region. In other words, the capacity of the UE is increased. Generally, in the system that uses a bandwidth of 20 MHz and 100 RBs, about 22 legacy CCEs may be used in one OFDM symbol, and 66 legacy CCEs may be used in three OFDM symbols. For example, if mini CCE of a size of three REGs is used for the fourth OFDM symbol, 66 or more mini CCEs may be obtained in one OFDM symbol, whereby 66 or more E-PDCCH CCEs may be addressed.

If the mini CCE is used, additional load may occur in that the UE should perform blind decoding for many CCEs in the same search space. However, this problem may be solved in such a manner that the search space (hereinafter, referred to as mini CCE search space) for the mini CCE is configured at a small size and the number of REGs constituting the mini CCE search space is configured to be small. For example, if the mini CCE search space is configured by 16 REGs, in case of the mini CCE having four REGs, blind decoding complexity of four times is only added. The UE which will use the mini CCE and the UE which does not use the mini CCE may be configured by RRC signaling in advance.

Additionally, some information of the DCI of the E-PDCCH may be included in the SC DCI. A DCI format field such as PDSCH RA information as well as the E-PDCCH search space may be included in the SC DCI.

The UE may detect its E-PDCCH by performing blind decoding in the E-PDCCH search space determined on the basis of the existing PDCCH or SC DCI, and may decode the PDSCH on the basis of the DCI carried by the E-PDCCH <Transmission Mode Dependant DCI Format Through E-PDCCH>

Figure 10:
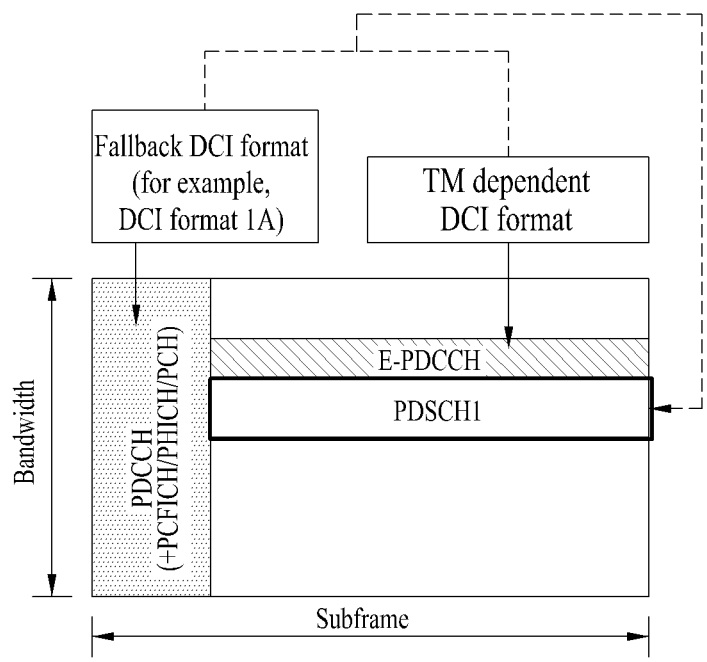
FIG. 10 is a diagram illustrating transmission of transmission mode dependent DCI and fallback DCI in accordance with the embodiment of the present invention.

FIG. 10 is a diagram illustrating transmission of transmission mode dependent DCI and fallback DCI in accordance with the embodiment of the present invention.

The UE of the existing 3GPP LTE system, that is, legacy UE performs blind decoding for TM DCI and fallback DCI in the PDCCH search space on the basis of UE identifier (ID). Unlike the existing 3GPP LTE system, the present invention suggests that a transmission mode TM dependent DCI format (hereinafter, referred to as TM DCI format) and DCI format (for example, DCI format 1A) (hereinafter, referred to as fallback DCI format) introduced for fallback operation are subjected to blind decoding at their respective search spaces different from each other.

For example, referring to FIG. 10, the DCI of the TM DCI format is transmitted and received using the E-PDCCH, and the DCI of the fallback DCI format is transmitted and received using the PDCCH. In this case, if a channel status is normal, the BS configures control information in accordance with a DCI format based on a specific TM determined by reflecting the corresponding channel status and transmits the control information to the UE through the E-PDCCH. If use of the DCI format based on the TM is not appropriate as the channel status is not normal, the BS configures control information in accordance with the fallback DCI format and transmits the control information to the UE through the PDCCH. Hereinafter, the control information configured by the TM DCI format will be referred to as TM DCI, and the control information configured by the fallback DCI format will be referred to as fallback DCI. If downlink transmission may be received normally in accordance with the TM, the UE decodes the TM DCI from the E-PDCCH (or R-PDCCH) and uses the decoded TM DCI for PDSCH1 decoding. If the UE is operated in accordance with the fallback mode as the channel status is not normal, the UE decodes the fallback DCI from the PDCCH and uses the decoded fallback DCI for PDSCH1 decoding. In other words, the TM DCI may be blind-decoded on the E-PDCCH, whereas the fallback DCI may be blind-decoded on the PDCCH. By contrast, the TM DCI may be blind-decoded on the PDCCH, whereas the fallback DCI may be blind-decoded on the E-PDCCH. Whether the TM DCI is transmitted on the PDCCH or the E-PDCCH or whether the fallback DCI is transmitted on the PDCCH or the E-PDCCH may be configured in advance by RRC signaling. In the fallback mode, RNTI used for decoding of the E-PDCCH/PDCCH may be used for decoding of the PDCCH/E-PDCCH, or a newly defined RNTI may be used.

For another example, in the same manner as the legacy UE, configuration as to whether the UE will be operated using the PDCCH only or both the PDCCH and the E-PDCCH may be notified to the UE in advance through RRC signaling. Alternatively, the configuration may be notified to the UE per subframe or if necessary through physical layer signaling or MAC layer signaling. In the same manner as the method described in the embodiment of <E-PDCCH search space configuration>, some or all of the information on the E-PDCCH configuration may be transmitted and received in the PDCCH region.

It is assumed that E-PDCCH carrying SCC scheduling assignment information is transmitted in a PCC PDSCH region under a carrier aggregation status. Even under the carrier aggregation status, TM DCI and fallback DCI are differentiated from each other and transmitted in their respective regions different from each other.

For reference, although FIG. 10 illustrates that the E-PDCCH is transmitted using a pair of PRBs in accordance with a frequency division multiplexing (FDM) mode, the E-PDCCH search spaces may be configured at the first slot and the second slot separately on the basis of the boundary of the slot, and DL/UL grants may be transmitted or received in each search space. For another example, it is limited that the DL grant is only transmitted and received in the first slot and the UL grant is only transmitted and received in the second slot.

This embodiment may be used together with or separately from the embodiments on the aforementioned <E-PDCCH search space configuration information>.

<Prior Scheduling Based on E-PDCCH>

Figure 11:
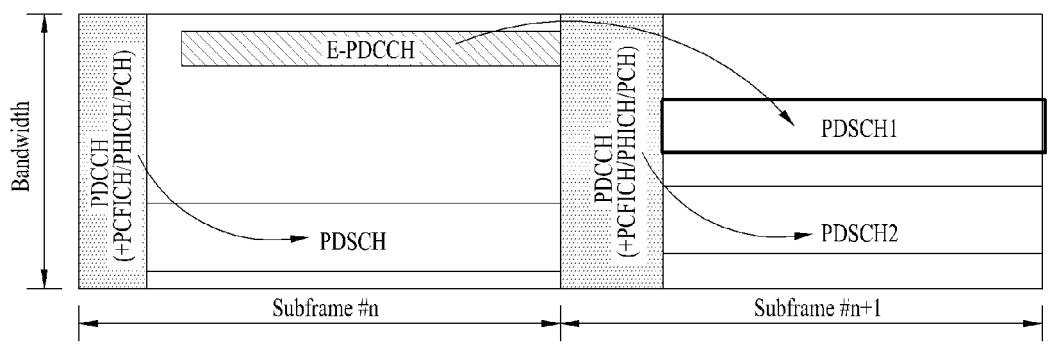
FIGS. 11 to 13 are diagrams illustrating prior scheduling based on E-PDCCH in accordance with the embodiment of the present invention.
Figure 12:
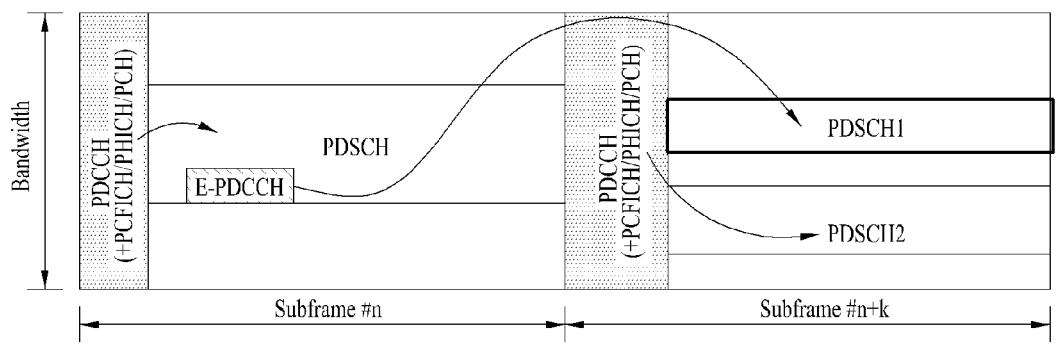
Figure 13:
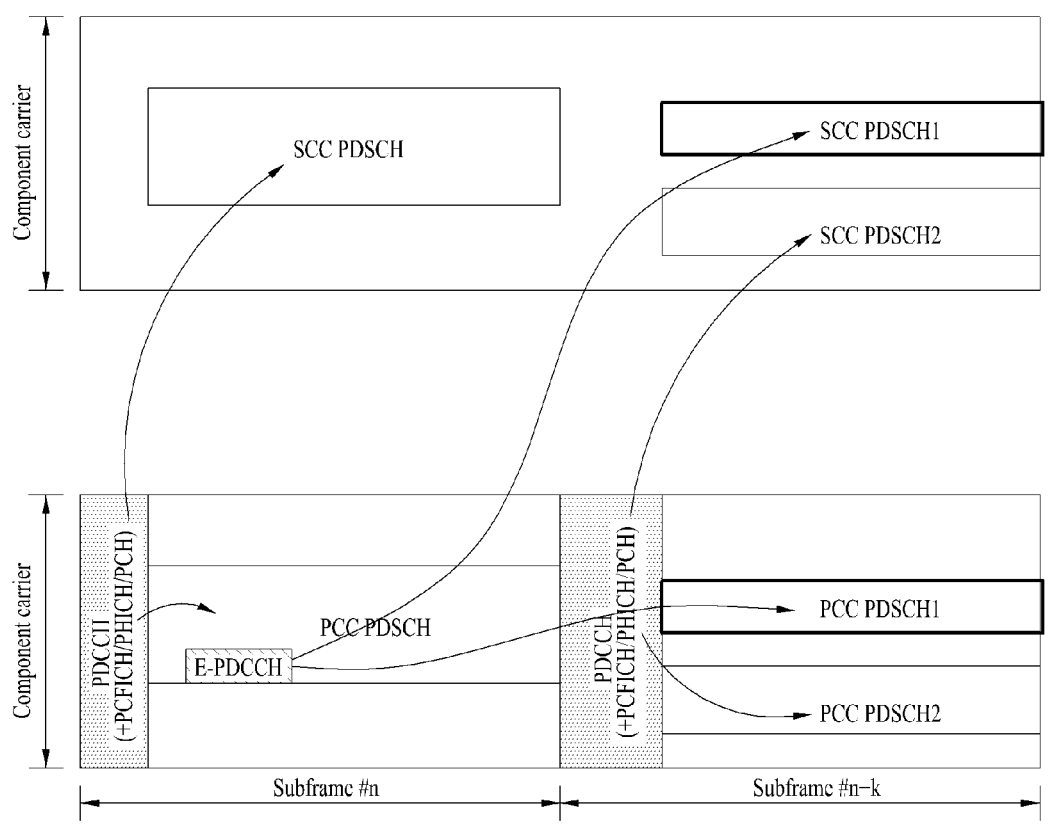

FIGS. 11 to 13 are diagrams illustrating prior scheduling based on E-PDCCH in accordance with the embodiment of the present invention.

If the E-PDCCH schedules the PDSCH transmitted and received in the same subframe, a processing time for ACK/NACK transmission may not be sufficient. Accordingly, the present invention suggests that the E-PDCCH is transmitted and received in a subframe located prior to a subframe in which the PDSCH is transmitted. Hereinafter, the subframe in which the E-PDCCH carrying prior scheduling information is located will be referred to as a scheduling subframe, and the subframe in which the PDSCH based on the scheduling information is located will be referred to as a scheduled subframe.

Referring to FIG. 11, the PDCCH carries information scheduling the PDSCH of the corresponding subframe. In other words, in case of the PDCCH, the scheduling subframe and the scheduled subframe are the same as each other. The E-PDCCH may carry information scheduling a PDSCH of a subframe #n+1 subsequent to a subframe #n which is the scheduling subframe. Although FIG. 11 illustrates that the E-PDCCH carrying scheduling information of UL/DL transmission for the scheduled subframe is transmitted and received one subframe earlier, the E-PDCCH may be transmitted and received multiple subframes earlier. The location of the subframe in which the E-PDCCH carrying prior scheduling information is transmitted and received may be varied. Preferably, the subframe in which the E-PDCCH carrying the prior scheduling information is transmitted and received may be predefined.

Referring to FIG. 12, the E-PDCCH for the scheduled subframe (subframe #n+k) may be transmitted and received by being embedded into the PDSCH of the scheduling subframe (subframe #n) which precedes the scheduled subframe by k subframe(s). In this case, k is a positive integer. For example, k may be 1 in case of FDD, and may be determined in accordance with corresponding TDD DL-UL configuration in case of TDD. The UE may obtain scheduling assignment for the PDSCH1 assigned to the subframe #n+k by demodulating the PDCCH in the subframe #n. In other words, the UE may obtain the PDSCH and the E-PDCCH on the basis of the PDCCH of the subframe #n, and obtain the PDSCH1 in the subframe located after the subframe #n indicated by the E-PDCCH. Accordingly, the PDSCH and the PDSCH1 may be transmitted and received in the subframe #n and the subframe #n+k by using one PDCCH transmitted in the subframe #n. According to the method of FIG. 12, a separate search space for the E-PDCCH is not required. If PDCCH multiplexing capacity is not sufficient due to many UEs to be scheduled, scheduling allocation may be performed in the form of bundled subframe scheduling.

In FIG. 12, the E-PDCCH may be embedded into a specific region in the form of rate matching or puncturing. In this case, the specific region may be predefined or may be deduced on the basis of PDSCH resource assignment (RA) information. In other words, the specific region for the E-PDCCH may be designated in advance per UE, or E-PDCCH resource within the PDSCH may be deduced on the basis of RA. For example, the first (second) resource of the smallest (greatest) index indicated by RA bitmap may be used for the E-PDCCH. If a low code rate is required in the same manner as CCE aggregation, a region to which the E-PDCCH is mapped is extended to a neighboring resource by using a frequency-first mapping rule or time-first mapping rule. Alternatively, in case of type 0 RA, one RB per RBG may be allocated to the E-PDCCH. In this way, if the E-PDCCH is separately mapped at an independent location within the PDSCH region, only the E-PDCCH may be decoded separately. The decoded E-PDCCH carries scheduling information on the PDSCH1 existing for the subframe #n+k. Meanwhile, the E-PDCCH may be encoded by being regarded as data in the same manner as the PDSCH.

FIG. 13 illustrates an example of FIG. 12 is extended to carrier aggregation. Referring to FIG. 13, the technology described in FIGS. 11 and 12 may be applied to FIG. 13 except that scheduling information for SCC PDSCH1 of the subframe #n from among PDSCHs (hereinafter, SCC PDSCH) transmitted through the SCC is transmitted through the PCC in the subframe #n.

In the embodiments of FIGS. 11 to 13, prior scheduling based on the E-PDCCH may be configured by RRC in advance, or may be configured in association with a transmission mode. Alternatively, indication information indicating the presence of the E-PDCCH may be included in the PDCCH.

This embodiment may be used together with or separately from the embodiments on the aforementioned <E-PDCCH search space configuration information> and/or <Transmission mode dependent DCI format through E-PDCCH>.

<Cross-Carrier Scheduling Based on E-PDCCH>

Figure 14:
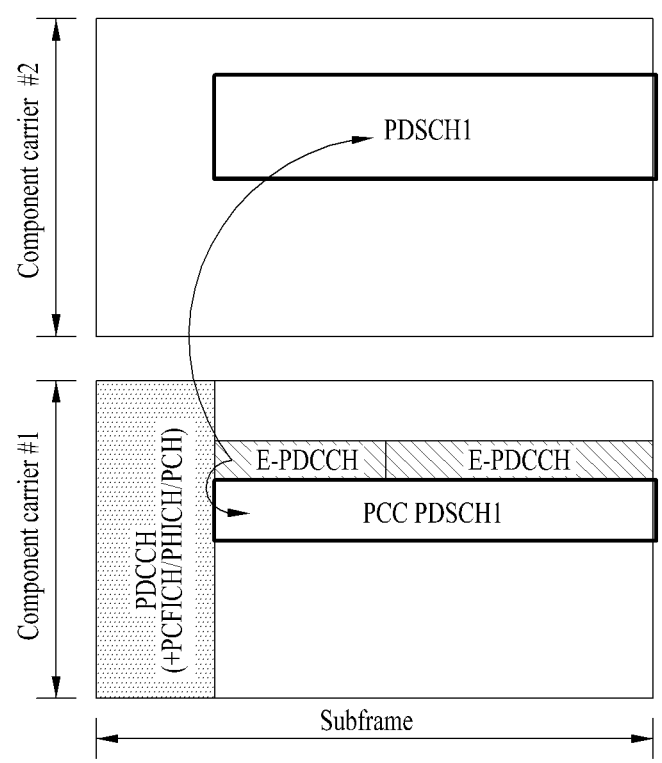
FIGS. 14 to 16 are diagrams illustrating cross-carrier scheduling based on E-PDCCH in accordance with the embodiment of the present invention.
Figure 15:
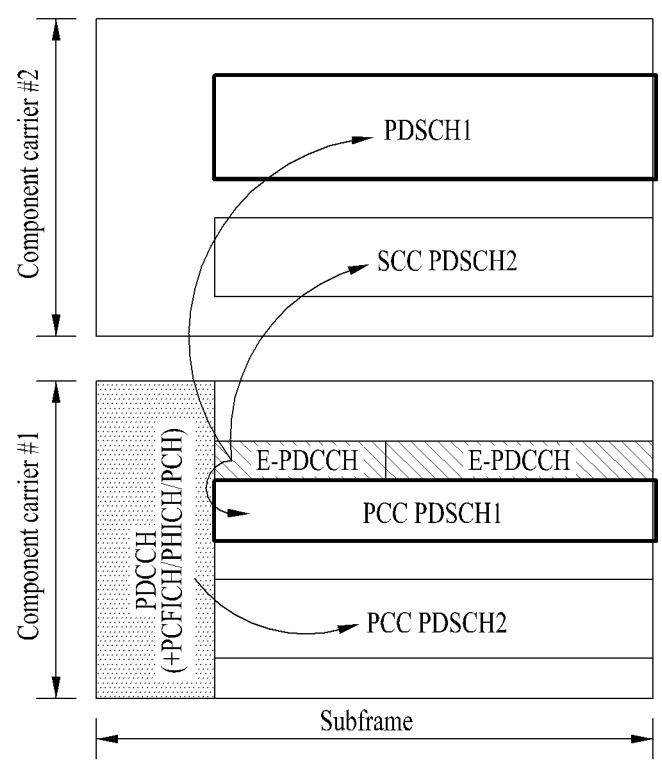
Figure 16:
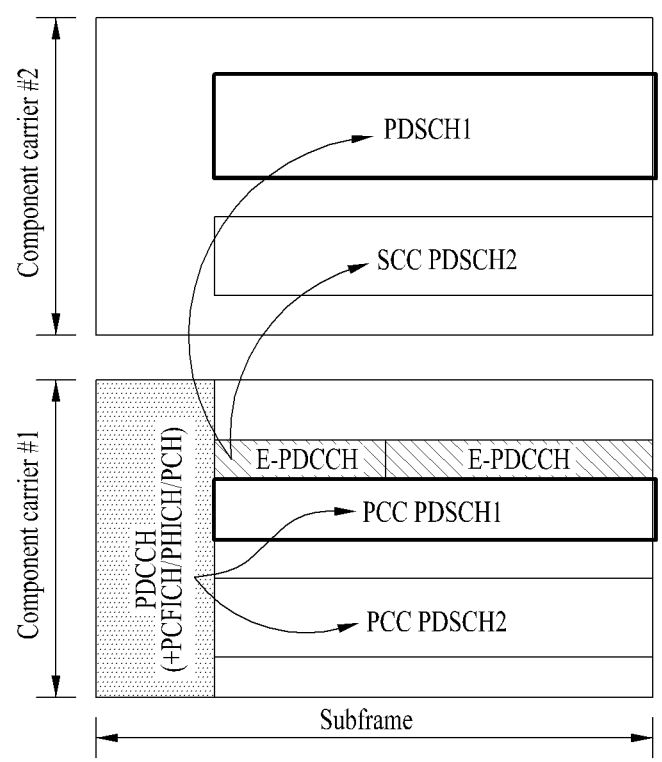

FIGS. 14 to 16 are diagrams illustrating cross-carrier scheduling based on E-PDCCH in accordance with the embodiment of the present invention.

In the aforementioned embodiments, the E-PDCCH is used to carry scheduling allocation for PDSCH1. The present invention suggests an embodiment that the E-PDCCH is used for cross-carrier scheduling. For example, the PDCCH for the SCC (hereinafter, referred to as SCC PDCCH) is transmitted and received in the PDSCH region instead of the PDCCH region, whereby the PDCCH may be used for scheduling allocation for the PDSCH transmitted and received on the PCC (hereinafter, referred to as PCC PDSCH) and/or the SCC PDSCH.

For example, referring to FIG. 14, if the UE cannot listen to the PDCCH or if the PDCCH is not involved in PDSCH scheduling, the E-PDCCH carries scheduling information for the PCC PDSCH and SCC PDCCH.

For another example, cross-carrier scheduling may be performed by combination of the PDCCH and the E-PDCCH. Referring to FIG. 15, the PDCCH may carry scheduling allocation only related to PCC PDSCH2, and the E-PDCCH may carry scheduling allocation for SCC PDSCH2 as well as the PCC PDSCH1 and the SCC PDSCH1. In other words, the E-PDCCH may carry scheduling information for a plurality of carriers. In this case, scheduling for both component carrier #1 which is scheduling CC and component carrier #2 which is scheduled CC may be allocated to the UE configured to listen to the E-PDCCH only.

Referring to FIG. 16, the PDCCH may carry scheduling allocation only for the PCC PDSCH2, and the E-PDCCH may carry allocation information for PDSCH1, SCC PDSCH1, and SCC PDSCH2. In other words, the E-PDCCH may be used to be dedicated for cross-carrier scheduling.

If carrier aggregation is configured, the amount of downlink control information is increased, whereby the PDCCH region may be insufficient. In this case, if cross-carrier scheduling is further performed, necessary downlink control information may not be transmitted if using the PDCCH region only. In accordance with this embodiment, if the E-PDCCH is used for cross-carrier scheduling, the problem of the insufficient PDCCH region may be solved.

Although FIGS. 13 to 16 illustrate that component carrier #1 which is PCC is a scheduling CC and component carrier #2 which is SCC is a scheduled CC, it is not required that the scheduling CC should be the PCC. In other words, the SCC may be the scheduling CC and thus may be used for transmission and reception of scheduling information for another SCC.

This embodiment may be used together with or separately from the embodiments on the aforementioned <E-PDCCH search space configuration information>, <Transmission mode dependent DCI format through E-PDCCH>, and/or <Prior scheduling based on E-PDCCH>.

The aforementioned embodiments of the present invention have been described based on that the E-PDCCH carries DL grant which is scheduling information on the PDSCH. However, the E-PDCCH may be applied to a case where the E-PDCCH carries another DCI not the DL grant. For example, the E-PDCCH may carry UL grant. In this case, the UE that has detected the E-PDCCH may be configured to transmit the PUSCH based on the UL grant in the uplink subframe, associated with the downlink subframe in which the E-PDCCH is detected, (for example, uplink subframe after a predetermined number of subframes from the downlink subframe).

Figure 17:
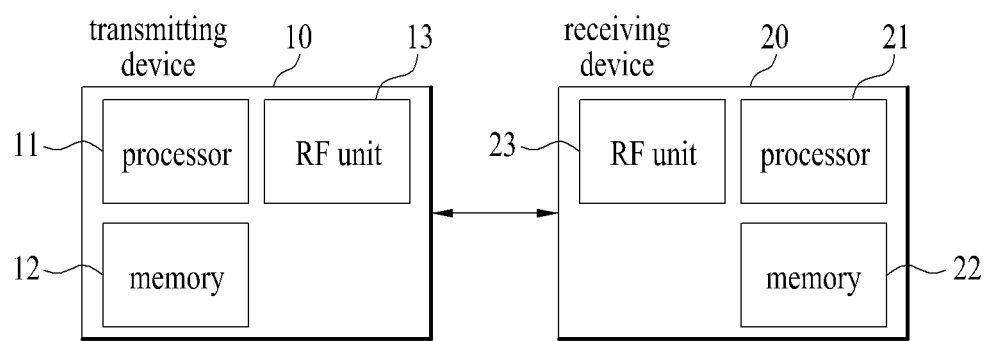
FIG. 17 is a block diagram illustrating elements of a transmission device 10 and a receiving device 20, which perform the present invention.

FIG. 17 is a block diagram illustrating elements of a transmission device 10 and a receiving device 20, which perform the present invention.

The transmission device 10 and the receiving device 20 respectively include a radio frequency (RF) unit 13, 23 for transmitting or receiving a radio signal carrying information and/or data, signal or message, a memory 12, 22 storing various kinds of information related to communication within a wireless communication system, and a processor 11, 21 connected with the RF unit 13, 23 and the memory 12, 22 and configured to control the memory 12, 22 and/or the RF unit 13, 23 to allow the corresponding device to perform at least one of the aforementioned embodiments of the present invention.

The memory 12, 22 may store a program for processing and control of the processor 11, 21 and temporarily store input/output information. The memory 12, 22 may be used as a buffer.

The processor 11, 21 generally controls the overall operation of various modules of the transmission device or the receiving device. In particular, the processor 11, 21 may perform a controller function for implementing the aforementioned embodiments of the present invention. The processor 11, 21 may be referred to as a controller, a microcontroller, a microprocessor, and a microcomputer. The processor 11, 21 may be implemented by hardware, firmware, software, or their combination. If the present invention is implemented by hardware, application specific integrated circuits (ASICs), digital signal processors (DSPs), digital signal processing devices (DSPDs), programmable logic devices (PLDs), and field programmable gate arrays (FPGAs), which are configured to perform the present invention, may be provided in the processor 11, 21. Meanwhile, if the present invention is implemented by firmware or software, the firmware or software may be configured to include a module, a procedure, or a function, which performs functions or operations of the present invention. The firmware or software configured to perform the present invention may be provided in the processor 11, 21 or may be stored in the memory 12, 22 and then may be driven by the processor 11, 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts desired data sequence into K number of layers through demultiplexing, channel coding, scrambling, modulation, etc. The coded data sequence may be referred to as codeword, and is equivalent to a transport block which is a data block provided by a medium access control (MAC) layer. One transport block (TB) is coded into one codeword, wherein each codeword is transmitted to the receiving device in a form of one or more layers. For frequency up-conversion, the RF unit 13 may include an oscillator. The RF unit 13 may include $N_t$ number ($N_t$ is a positive integer) of transmitting antennas.

A signal processing procedure of the receiving device 20 is configured by an inverse procedure of the signal processing procedure of the transmitting device 10. Under the control of the processor 21, the RF unit 23 of the receiving device 20 receives a radio signal transmitted by the transmitting device 10. The RF unit 23 may include $N_r$ number of receiving antennas ($N_r$ is a positive integer). The RF unit 23 frequency down-coverts each of the signals received through the receiving antennas to recover baseband signals. The RF unit 23 may include an oscillator for frequency down-conversion. The processor 21 may perform decoding and demodulation for the radio signals received through the receiving antennas to recover data that the transmitting device originally intended to transmit.

The RF unit 13, 23 includes one or more antennas. The antennas may transmit the signals processed by the RF unit 13, 23 to the outside or receive the radio signals from the outside and transfer the radio signals to the RF unit 13, 23 under the control of the processor 11, 21 in accordance with one embodiment of the present invention. The antennas may be referred to as antenna ports. Each antenna may correspond to one physical antenna or may be configured by combination of more than one physical antenna elements. The signal transmitted from each antenna cannot be further deconstructed by the receiving device 20. The transmitted reference signal (RS) corresponding to an antenna defines the antenna from the view point of the receiving device 20, and enables the receiving device 20 to derive channel estimation for that antenna regardless of whether it represents a single radio channel from one physical antenna or a composite channel from a plurality of physical antenna elements including that antenna. In other words, the antenna is defined such that a channel carrying a symbol of the antenna may be obtained from a channel carrying another symbol of the same antenna. The RF unit that supports a multi-input multi-output (MIMO) function which uses a plurality of antennas for data transmission/reception may be connected with two or more antennas.

In the embodiments of the present invention, the UE is operated as the transmitting device 10 on the uplink and as the receiving device 20 on the downlink. In the embodiments of the present invention, the BS is operated as the receiving device 20 on the uplink and as the transmitting device 10 on the downlink.

The processor of the BS (hereinafter, referred to as BS processor) according to the present invention may configure PDCCH and/or E-PDCCH in accordance with one of the aforementioned embodiments and control the RF unit (hereinafter, referred to as BS RF unit) of the BS to transmit the PDCCH and/or the E-PDCCH to the UE. Also, the BS processor may control the BS RF unit to transmit the PDSCH or receive the PUSCH from the UE to the UE in accordance with DCI transmitted to the UE through the PDCCH and/or the E-PDCCH.

The BS processor may control the BS RF unit to transmit E-PDCCH search space configuration information by using C-PDCCH or existing PDCCH or SC DCI. The BS processor may configure DCI to be transmitted through the PDCCH in accordance with a specific DCI format (for example, DCI format 1A) only and configure DCI to be transmitted through the E-PDCCH in accordance with a DCI format corresponding to the corresponding transmission mode. For example, the BS processor may configure DCI to be transmitted through the PDCCH in accordance with the DCI format 1A, transmit control information of the DCI format 1A on the PDCCH by controlling the BS RF unit, configure DCI to be transmitted through the E-PDCCH in accordance with the DCI format corresponding to the transmission mode to the corresponding UE, and transmit DCI format, which is dependent on the transmission mode to the corresponding UE, to the UE by controlling the BS RF unit, and vice versa. Also, the BS processor may use the E-PDCCH for prior scheduling and/or cross-carrier scheduling. For example, the BS processor may control the BS RF unit to transmit scheduling information for a data channel to be transmitted and received through a specific CC to a corresponding UE by using another CC different from the specific CC.

The processor of the UE (hereinafter, referred to as UE processor) or the processor of the relay (hereinafter, referred to as relay processor) may detect the PDDCH and/or the E-PDCCH in accordance with any one of the aforementioned embodiments and receive PDSCH and/or transmit PUSCH by controlling the corresponding RF unit on the basis of DCI carried by the PDCCH and/or the E-PDCCH. The UE processor may obtain the E-PDCCH search space configuration information in accordance with the embodiment of <E-PDCCH search space configuration information> and perform blind decoding for detection of the E-PDCCH on the E-PDCCH search space based on the E-PDCCH search space configuration information.

In performing blind decoding at the PDCCH search space and the E-PDCCH search space, the UE processor may be configured to perform blind decoding on the PDCCH search space in accordance with the fallback DCI format only and perform blind decoding at the E-PDCCH search space in accordance with the transmission mode of the UE. Alternatively, the UE processor may be configured to perform blind decoding at the PDCCH search space in accordance with the DCI format corresponding to the transmission mode of the UE and perform blind decoding at the E-PDCCH search space in accordance with the fallback DCI format only. The E-PDCCH may carry scheduling information for a later subframe not the subframe that includes the E-PDCCH. The E-PDCCH may be used for transmission of scheduling information for another CC not the CC used for transmission of the E-PDCCH. If the E-PDCCH is detected on a certain CC, the UE processor may control the RF unit of the UE (hereinafter, referred to as UE RF unit) to receive the PDSCH or transmit the PUSCH on the certain CC associated with the DCI on the basis of the DCI carried by the E-PDCCH.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied to the base station, the relay, the user equipment, other equipment in the wireless communication system.

The invention claimed is:

1. A method for receiving, by a user equipment, a downlink signal from a base station, the method comprising:
    detecting a physical downlink control channel (PDCCH) by blind decoding a plurality of PDCCH candidates according to only a predetermined downlink control information (DCI) format independent of a transmission mode of the user equipment within a PDCCH search space located in a control region of a first subframe,
    where the first subframe is divided into the control region and a data region in a time domain, and the control region is located at a front of the first subframe in the time domain;
    detecting an enhanced PDCCH (EPDCCH) by blind decoding a plurality of EPDCCH candidates according to only a transmission mode dependent DCI format (TM DCI format) corresponding to the transmission mode of the user equipment within an EPDCCH search space located in the data region of the first subframe based on the PDCCH; and
    receiving a physical downlink shared channel (PDSCH) in a data region of a second subframe based on the EPDCCH,
    wherein the PDCCH carries configuration information of the EPDCCH search space, and
    wherein the first subframe, in which the EPDCCH is detected, precedes the second subframe, in which the PDSCH is received based on the EPDCCH, in the time domain.

2. The method of claim 1, wherein the predetermined DCI format is a DCI format 1A defined for a single antenna port.

3. The method of claim 1, wherein the PDCCH carries EPDCCH start information indicating from which orthogonal frequency division multiplexing (OFDM) symbol among a plurality of OFDM symbols of the first subframe the EPDCCH starts.

4. The method of claim 1, wherein the PDCCH carries PDSCH start information indicating from which OFDM symbol among a plurality of OFDM symbols of the second subframe the PDSCH starts.

5. The method of claim 1,
    wherein the PDCCH is a compact PDCCH (CPDCCH) which is different from a legacy PDCCH and defined to carry the configuration information of the EPDCCH search space, and
    wherein the CPDCCH consists of a plurality of mini control channel elements (mini CCEs), and each of the mini CCEs is smaller than a CCE used for transmission of the legacy PDCCH.

6. A user equipment for receiving a downlink signal from a base station, the user equipment comprising:
    a radio frequency (RF) unit configured to transmit or receive a signal; and
    a processor configured to control the RF unit,
    wherein the processor is configured to:
        detect a physical downlink control channel (PDCCH) by blind decoding a plurality of PDCCH candidates according to only a predetermined downlink control information format (DCI) independent of a transmission mode of the user equipment within a PDCCH search space located in a control region of a first subframe,
        where the first subframe is divided into the control region and a data region in a time domain, and the control region is located at a front of the first subframe in the time domain;
        detect an enhanced PDCCH (EPDCCH) by blind decoding a plurality of EPDCCH candidates according to only a transmission mode dependent DCI format (TM DCI format) corresponding to the transmission mode of the user equipment within an EPDCCH search space located in the data region of the first subframe based on the PDCCH; and
        control the RF unit to receive a physical downlink shared channel (PDSCH) in a data region of a second subframe based on the EPDCCH,
    wherein the PDCCH carries configuration information of the EPDCCH search space, and
    wherein the first subframe, in which the EPDCCH is detected, precedes the second subframe, in which the PDSCH is received based on the EPDCCH, in the time domain.

7. The user equipment of claim 6, wherein the predetermined DCI format is a DCI format 1A defined for a single antenna port.

8. The user equipment of claim 6, wherein the PDCCH carries EPDCCH start information indicating from which orthogonal frequency division multiplexing (OFDM) symbol among a plurality of OFDM symbols of the first subframe the EPDCCH starts.

9. The user equipment of claim 6, wherein the PDCCH carries PDSCH start information indicating from which OFDM symbol among a plurality of OFDM symbols of the second subframe the PDSCH starts.

10. The user equipment of claim 6,
    wherein the PDCCH is a compact PDCCH (CPDCCH) which is defined to carry the configuration information of the EPDCCH search space and different from a legacy PDCCH, and wherein the CPDCCH consists of a plurality of mini control channel elements (mini CCEs), and each of the mini CCEs is smaller than a CCE used for transmission of the legacy PDCCH.

* * * * *